United States Patent
Hodges

(10) Patent No.: US 10,176,471 B2
(45) Date of Patent: Jan. 8, 2019

(54) SYSTEMS AND METHODS FOR PROVIDING PRODUCT INFORMATION VIA AN INTERACTIVE DISPLAY DEVICE

(71) Applicant: GeoPRI, LLC, Arlington, MA (US)

(72) Inventor: Matthew Hodges, Arlington, MA (US)

(73) Assignee: GeoPRI, LLC, Arlington, MA (US)

( * ) Notice: Subject to any disclaimer, the term of this patent is extended or adjusted under 35 U.S.C. 154(b) by 233 days.

(21) Appl. No.: 15/176,349

(22) Filed: Jun. 8, 2016

(65) Prior Publication Data
US 2016/0364714 A1 Dec. 15, 2016

Related U.S. Application Data

(60) Provisional application No. 62/188,036, filed on Jul. 2, 2015, provisional application No. 62/173,189, filed on Jun. 9, 2015.

(51) Int. Cl.
*G06Q 20/20* (2012.01)
*G06F 17/30* (2006.01)
*G06Q 30/06* (2012.01)

(52) U.S. Cl.
CPC ..... *G06Q 20/208* (2013.01); *G06F 17/30876* (2013.01); *G06Q 30/0623* (2013.01); *G06Q 30/0643* (2013.01)

(58) Field of Classification Search
CPC ...... G06Q 20/208; G06Q 20/20; G06Q 30/06; G06Q 20/203; G06Q 30/0601
USPC .......................................... 705/23, 24, 26.81
See application file for complete search history.

(56) References Cited

U.S. PATENT DOCUMENTS

| 5,229,628 A * | 7/1993 | Kobayashi | G09F 9/33 257/103 |
| 5,442,962 A | 8/1995 | Lee | |
| 6,278,199 B1 * | 8/2001 | Grant | H01L 24/49 257/E25.016 |
| 6,529,940 B1 * | 3/2003 | Humble | G06Q 30/02 709/204 |
| 7,315,826 B1 * | 1/2008 | Guheen | G06F 17/3089 703/27 |

(Continued)

OTHER PUBLICATIONS

Search Report and Written Opinion dated Aug. 30, 2016 in corresponding counterpart international application PCT/US2016/036322.

*Primary Examiner* — Andrew Joseph Rudy
(74) *Attorney, Agent, or Firm* — Brown Rudnick LLP; Adam M. Schoen

(57) ABSTRACT

The invention generally relates to systems and methods for providing product information via an interactive display device in a dynamic format. The present invention implements a system for defining product variations and assigning references to them at the point of sale or delivery. The system further includes an interactive display device for providing informational data associated with a product variation assigned to a product upon recognition of the product in contact therewith. The present invention is unique in allowing a seller to assign or modify a reference associated with a unique identifier, such as a barcode label, at the point of sale or delivery, thereby changing the information delivered to the buyer based on details about the specific unit sold, the circumstances of the transaction, or the identity of the buyer.

20 Claims, 11 Drawing Sheets

(56) References Cited

U.S. PATENT DOCUMENTS

| | | | |
|---|---|---|---|
| 7,346,562 B2* | 3/2008 | Inoue | G06Q 30/0635 |
| | | | 705/26.81 |
| 8,019,333 B2* | 9/2011 | Seckendorf | G06Q 10/063 |
| | | | 382/149 |
| 8,548,860 B2* | 10/2013 | Junger | G06Q 20/203 |
| | | | 705/24 |
| 8,554,669 B2* | 10/2013 | Keithley | G06Q 30/0215 |
| | | | 705/39 |
| 9,210,472 B2* | 12/2015 | Andrews, II | G06Q 30/02 |
| 9,348,930 B2* | 5/2016 | Ali | G06F 17/3089 |
| 9,538,404 B2* | 1/2017 | Seckendorf | H04W 24/06 |
| 9,639,179 B2* | 5/2017 | Armstrong-Muntner | |
| | | | G06F 3/044 |
| 9,721,223 B2* | 8/2017 | Gentile | G06Q 10/08 |
| 9,876,776 B2* | 1/2018 | Scoda | H04L 63/08 |
| 9,928,493 B2* | 3/2018 | Parker | G06Q 20/202 |
| 2008/0109281 A1* | 5/2008 | Csoka | G06Q 20/10 |
| | | | 705/44 |
| 2009/0285483 A1 | 11/2009 | Guven et al. | |
| 2010/0282836 A1 | 11/2010 | Kempf et al. | |
| 2013/0110666 A1 | 5/2013 | Aubrey | |
| 2014/0164190 A1 | 6/2014 | Schiffman et al. | |
| 2014/0365336 A1 | 12/2014 | Hurewitz | |
| 2014/0374474 A1 | 12/2014 | Huang et al. | |

\* cited by examiner

300

- 310: Correlate a unique identifier associated with a product to an identification of the product

- 320: Transmit the correlation of the unique identifier to a server having a database that stores a plurality of different and separate product content references about the product

- 330: Recognize that the product has been placed on a display surface of an interactive display device

- 340: Recognize the unique identifier that is associated with the product

- 350: Generate and transmit a request to the server for information regarding the product based on the unique identifier

- 350: Receive one of the product content references assigned to the product from the server in response to request

- 370: Display informational data associated with the product content to a user via the display surface

FIG. 3

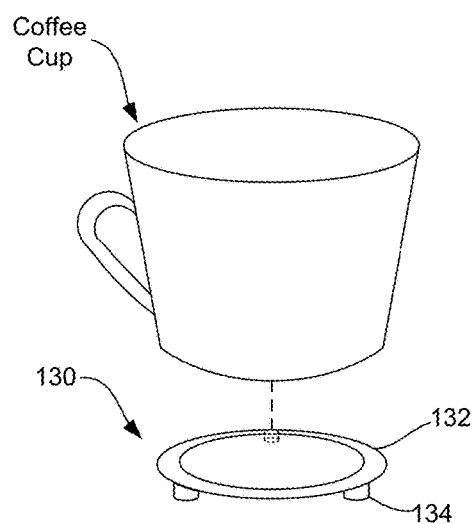
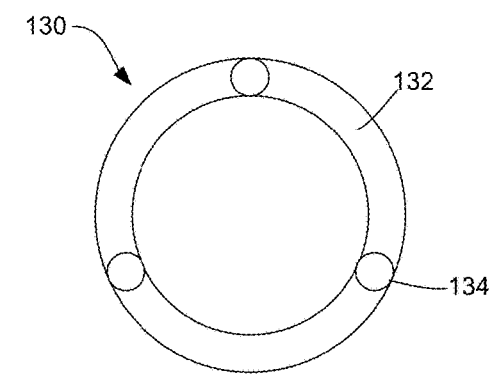
FIG. 8    FIG. 9
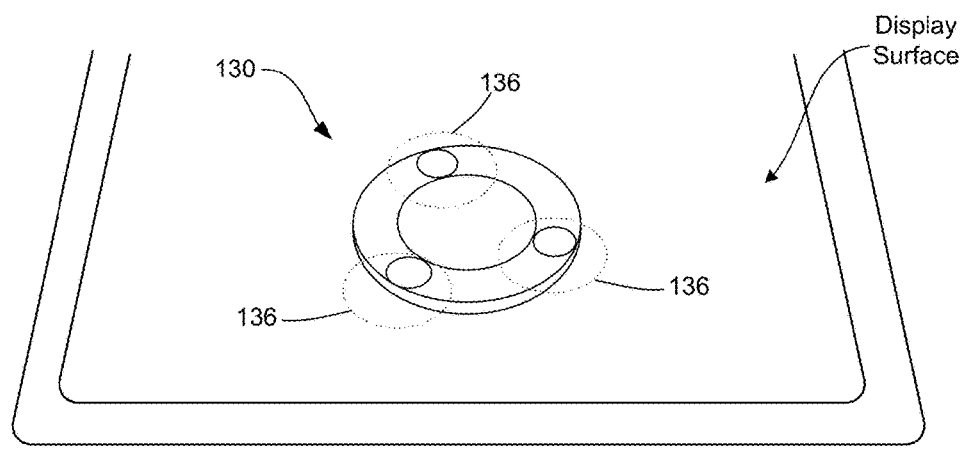
FIG. 10

SYSTEMS AND METHODS FOR PROVIDING PRODUCT INFORMATION VIA AN INTERACTIVE DISPLAY DEVICE

CROSS-REFERENCE TO RELATED APPLICATIONS

This application claims the benefit of, and priority to, U.S. Provisional Patent Application No. 62/173,189, filed Jun. 9, 2015, and U.S. Provisional Patent Application No. 62/188,036, filed Jul. 2, 2015, the contents of each of which are incorporated by reference herein in their entireties.

FIELD OF THE INVENTION

The invention generally relates to systems and methods for providing product information via an interactive display device.

BACKGROUND

Specialty goods and services may have distinctive features or information associated with an individual serving, unit, batch, or lot of a product that can add value to a transaction, and a consumer may be interested in knowing such specific information about a product they either purchased or are interested in purchasing. In the instance of food for example, a consumer may want to know various aspects of a food product, such as specific characteristics of the food product, origin of the food product, as well as who produced it, how it was produced, and information related to the seller of the food product.

Some companies may choose to make such product information freely available to customers. For example, some companies utilize barcodes or "best-by" dates as a way of allowing a consumer to retrieve information related to a product that has been, or will be, purchased. The consumer can scan the barcode (e.g., via a smartphone equipped with barcode scanner software) or enter the "best-by" date into a web site and receive product information related to the food product.

A problem with this approach is that the barcodes or best-by dates are normally applied at the point of production to every instance of a product, or to every instance produced at a given location or time, and the barcodes refer all such instances to the same body of information, i.e., the content being delivered is static and the same for every purchaser of the barcoded product. Due to the static nature of the barcoded product, sellers are unable to provide comprehensive and dynamic information related to a product at the point of sale or delivery in real-, or near real-, time.

Some companies have developed computing devices capable of recognizing objects, such that a user may simply place a product in contact with, or near, the device and in turn the device is configured to identify the object and further provide information (e.g., display text, images, videos, etc.) associated with the product. Such computing devices, however, generally rely on the detection of an identifier (e.g., barcode label or the like) associated with the product, wherein the identifier generally refers to a fixed body of information, i.e., the content being delivered is static and the same for every purchaser of the product. Thus, although some current interactive devices are able to recognize a product and display information associated with the product in a passive manner, the static nature of the identifier associated with the product still limits the ability of a seller to provide comprehensive and dynamic information related to a product at the point of sale or delivery in real-, or near real-, time.

SUMMARY

The present invention is directed to a system for providing product information to a user in a dynamic format via an interactive display device. The system generally includes a computing device configured to define product variations and assign references to them at the point of sale or delivery of the product and an interactive display device for displaying product information to a user based on such product variations. In particular, the computing device, which may be associated with a Point of Sale or Point of Delivery (POS/POD) seller device, allows a seller to correlate a unique identifier that is associated with a product to an identification of the product and further transmit the correlation to one or more servers. The server includes a plurality of different and separate content references about the product. In some embodiments, the plurality of different and separate product content references may include, for example, one or more product information links (e.g., uniform resource locator (URL)) directed to informational data associated with the product, or to other product content references. Additionally, or alternatively, the plurality of different and separate content references may include other sources of informational data and need not be limited to web-based data. For example, in some embodiments, in addition to, or alternatively, the content references may include one or more media files (e.g., text, images, video, audio, etc.) having information associated with the product.

In embodiments described herein, the product generally refers to a food or beverage product held, or otherwise contained, within a container or serving vessel, such as a coffee product provided within a cup, or food on a plate. Furthermore, the product may have multiple components, such as one or more add-ins for the coffee (e.g., milk, cream, sugar, sweetener, etc.). Accordingly, the plurality of different and separate content references may include informational data associated with one or more of these components, such as the coffee itself, and, in some instances, the one or more add-ins included in the cup of coffee. In other embodiments, the product may be considered to incorporate the container itself as well as the various contents thereof.

The interactive display device is configured to provide product information to a user (e.g., consumer) upon recognition of the unique identifier associated with the product, wherein the unique identifier is generally placed on, or tied to, the container. The product information provided is associated with the variation previously assigned to the unique identifier by the seller. For example, upon placement of a product container on, or in close proximity to, a display surface, the interactive display device is configured to recognize the unique identifier that is associated with the product. The interactive display device then generates and transmits a request for information regarding the product to the one or more servers based on the recognized identifier. The interactive display device then receives the particular product variation assigned to the unique identifier and displays informational data associated with the variation to a user in an interactive format. The interactive display device may include one or more sensors configured to detect placement of the product upon the display surface and further read, or otherwise identify, the unique identifier. The sensors may include, but are not limited to, one or more digital imaging devices (e.g., digital camera(s), near-infrared (IR) camera(s)), optical sensors (e.g., ambient light sensors, near-IR light sources), touch sensors (e.g., capacitance touchscreen), weight sensors, and the like.

The present invention is unique in allowing a seller to assign or modify a reference associated with such a barcode, or other unique identifier, at the point of sale or delivery, thereby changing the information delivered to the buyer based on details about the specific unit sold, the circumstances of the transaction, or the identity of the buyer. These details are often not known until the point of sale or delivery, when it is generally not feasible to re-print a label or re-tag merchandise. In that manner, the present invention allows sellers of products and services to define and manage variations of a product or of a transaction that may be significant to themselves or their customers; then, at the point of sale or delivery, they may associate information specific to these variations with the physical product or service. In this manner, the plurality of different and separate product content references can be modified on the fly so as to account for details associated with the product at the point of sale or delivery, including characteristics of the individual unit of product sold or delivered, the circumstances surrounding the transaction, as well as characteristics of the seller or consumer, while still providing traceability of that product. Accordingly, the systems and methods of the invention are able to provide comprehensive traceability of a product and other relevant information in a dynamic format for subsequent display on an interactive display device.

In some embodiments, the product is a food or beverage product held by a container and the unique identifier is associated with the container. The unique identifier may include a machine-readable identifier label including, but not limited to, text, graphics, an image, a linear barcode, a matrix barcode, an RFID element, and a combination thereof. In other embodiments, the interactive display device includes a touchscreen display and the unique identifier may include a passive untouched capacitive assembly. The passive untouched capacitive assembly may include a contact surface that includes a circular ring having two or more electrically conductive nibs that protrude from the ring, the nibs being configured on the passive untouched capacitive assembly such that a touch sensor of the interactive display device recognizes that the product has been placed on the display surface due to the nibs. The touch sensor may be configured to detect multi-point input on the display surface via capacitance measurement. In some embodiments, the passive untouched capacitive assembly is a circular ring that comprises three or more electrically conductive nibs. The three or more electrically conductive nibs may be uniquely arranged about each passive untouched capacitive assembly.

In some embodiments, at least one of the computing device, the server, and the interactive display device are able to wirelessly transmit data via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards as of June 2015, and a combination thereof.

It should be noted that, although the systems and methods of the present invention are not intended solely for applications related to traceability, such systems and methods play an important role in traceability. For example, the last links in the supply chain, which may extend from the point when the finished goods are packaged by the producer up to and including the point they are received by the final consumer, typically occur after the final product labeling has occurred. The systems and methods of the present invention provide a means of appending these final transitions in the supply chain to the history of a given unit of a product.

BRIEF DESCRIPTION OF THE DRAWINGS

FIG. 3 is a flow diagram illustrating one embodiment of a method for providing product information to a user.

FIG. 8 is a perspective view of a passive untouched capacitive assembly couplable to a product container and serving as a unique identifier for the product.

FIG. 9 is a bottom view of the passive untouched capacitive assembly illustrating the electrically conductive nibs.

FIG. 10 is a perspective view of placement of the passive untouched capacitive assembly upon the display surface of the interactive display device and subsequent detection of the assembly via one or more touch sensors.

DETAILED DESCRIPTION

Figure 1:
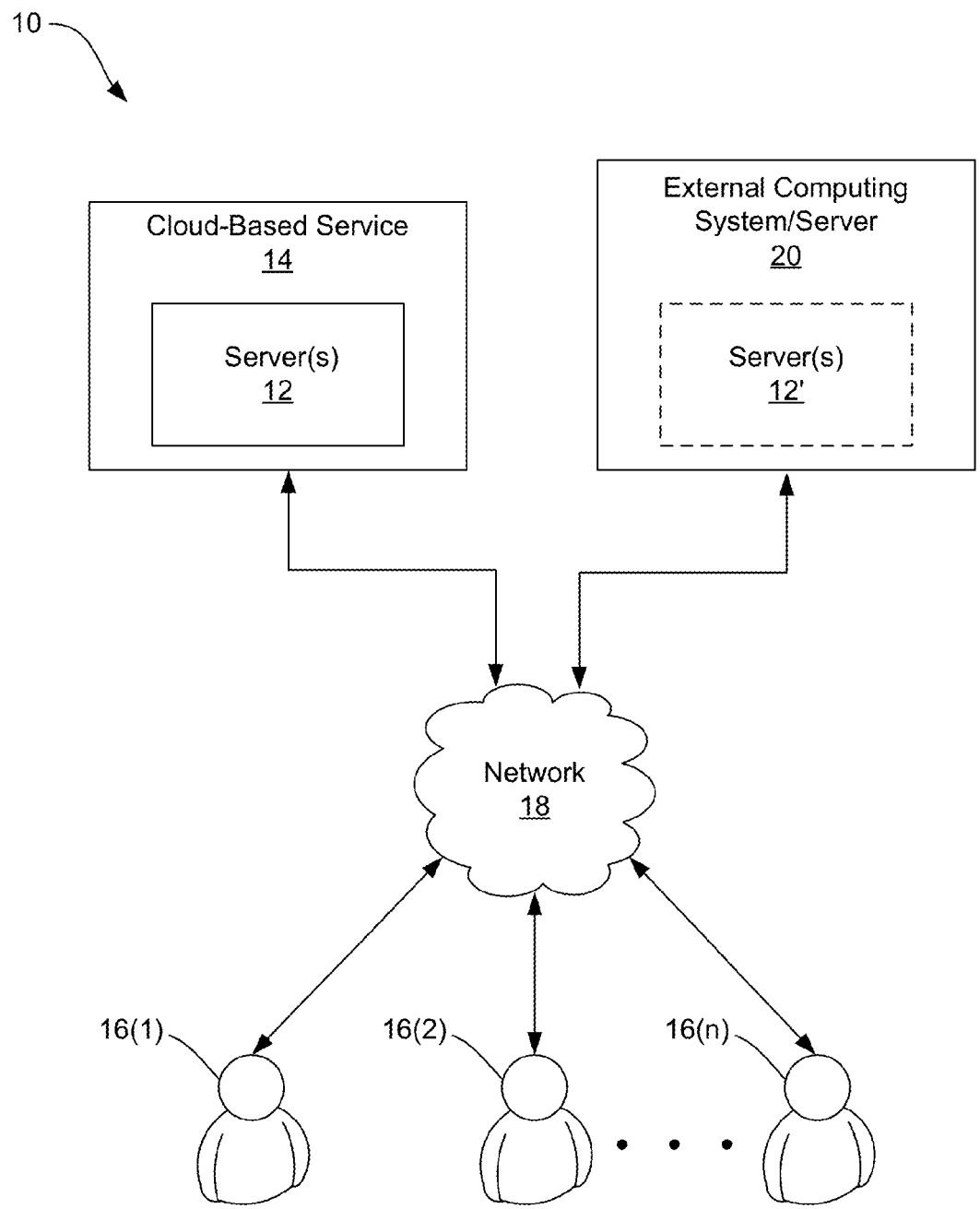
FIG. 1 is a block diagram illustrating one embodiment of an exemplary system for providing product information to a user.

The present invention is directed to a system for providing product information to a user in a dynamic format via an interactive display device. The system generally includes a computing device configured to define product variations and assign references to them at the point of sale or delivery of the product and an interactive display device for displaying product information to a user based on such product variations. In particular, the computing device, which may be associated with a Point of Sale or Point of Delivery (POS/POD) seller device, allows a seller to correlate a unique identifier that is associated with a product to an identification of the product and further transmit the correlation to one or more servers. The server includes a plurality of different and separate content references about the product. In some embodiments, the plurality of different and separate product content references may include, for example, one or more product information links (e.g., uniform resource locator (URL)) directed to informational data associated with the product, or to other product content references. Additionally, or alternatively, the plurality of different and separate content references may include other sources of informational data and need not be limited to web-based data. For example, in some embodiments, in addition to, or alternatively, the content references may include one or more media files (e.g., text, images, video, audio, etc.) having information associated with the product.

In embodiments described herein, the product generally refers to a food or beverage product held, or otherwise contained, within a container, such as a coffee product provided within a cup, or food on a plate. Furthermore, the product may have multiple components, such as one or more add-ins for the coffee (e.g., milk, cream, sugar, sweetener, etc.). Accordingly, the plurality of different and separate content references may include informational data associated with one or more of these components, such as the coffee itself, and, in some instances, the one or more add-ins included in the cup of coffee. In other embodiments, the product may be considered to incorporate the container itself as well as the various contents thereof.

The interactive display device is configured to provide product information to a user (e.g., consumer) upon recognition of the unique identifier associated with the product, wherein the unique identifier is generally placed on, or tied to, the container. The product information provided is associated with the variation previously assigned to the unique identifier by the seller. For example, upon placement of the product on, or in close proximity to, a display surface, the interactive display device is configured to recognize placement of product on, or near, the display surface. As previously described, the product may generally include a food or beverage product (e.g., coffee) held by a container (e.g., coffee cup or saucer/plate associated with coffee cup). Accordingly, the interactive display device is configured to allow non-conductive physical objects, such as a product container, or object associated with the product container, to be used as input devices.

The interactive display device is configured to recognize and identify a product within the container based on recognition of a unique identifier associated with the product container. For example, the unique identifier may include a machine-readable identifier label, including, but not limited to, text, graphics, an image, a linear barcode, a matrix barcode, an RFID element, and a combination thereof. In some embodiments, the interactive display device may include a touchscreen display and the unique identifier may include a passive untouched capacitive assembly associated with the product container. The interactive display device may include one or more sensors configured to detect placement of the product upon the display surface and further read, or otherwise identify, the unique identifier. The sensors may include, but are not limited to, one or more digital imaging devices (e.g., digital camera(s), near-infrared (IR) camera(s)), optical sensors (e.g., ambient light sensors, near-IR light sources), touch sensors (e.g., capacitance touchscreen), weight sensors, and the like.

Upon recognizing the unique identifier, the interactive display device is configured to display specific product information assigned to the unique identifier to a user via the display surface, wherein the display surface may provide a graphical user interface (GUI) allowing the user to interact with the product information.

For purposes of discussion, and ease of explanation, the exemplary systems and methods described herein refer to providing product information for a food product, specifically coffee. However, it should be noted that systems and methods of the present invention apply to all types of products, goods, services, resources, and the like, and are not limited solely to food-related products. For example, systems and methods of the present invention may apply to all types of commodities, including agricultural commodity goods, including grains (e.g., corn, oats, wheat, rice, etc.), food goods (e.g., cocoa, salt, sugar, coffee, tea, spices, produce, fruits, vegetables, nuts, seeds (e.g., sesame), legumes, etc.), livestock and meat (e.g., chicken, cattle, hogs, etc.), energy commodity goods (e.g., crude oil, ethanol, natural gas, heating oil, propane, electricity, etc.), hard commodity goods, such as metals (e.g., industrial metals such as copper, lead, tin, aluminum, steel, etc., as well as precious metals such as gold, platinum, silver, etc.), as well as minerals or other mined goods (e.g., coal, precious gemstones, etc.). The systems and methods of the present invention may also apply to other types of goods and products, including, but not limited to, durable goods, such as lumber, furniture, appliances, electronics, toys, as well as nondurable or soft goods, such as textiles, clothing, cleaning products, pharmaceutical products such as medications, and the like.

FIG. 1 is a block diagram illustrating one embodiment of an exemplary system 10 for providing traceability and supply chain management. As shown, the system 10 includes a server 12 embodied on an internet-based computing system/service. For example, as shown, the server 12 may be embodied on a cloud-based service 14, for example. The server 12 is configured to communicate and share data with one or more users 16(1)-16(n) over a network 18. In the present context, the users 16(1)-16(n) may include one or more members of a supply chain associated with a particular product, for example, a seller of a product (e.g., retailer, store owner, etc.) and a consumer or customer to which the product is to be sold/provided. Additionally, or alternatively, some members of a supply chain 16(1)-16(n) may include a manufacturer, producer, or distributor of the cargo. In some embodiments, a user 16 may further include one or more members of a commodity exchange, particularly when the product is a commodity good, such as coffee.

The system 10 further includes an external computing system/server 20 configured to communicate with at least the cloud-based service 14, and subsequently the server 12, via the network 18. The external computing system/server 20 may be embodied as a remote server, for example, for communicating with the server 12 and for performing the other functions described herein. Similarly, in some embodiments, the server 12 may be embodied on the external computing system/server 20. In the embodiments described herein, the external computing system/server 20 may be embodied as a remote server having one or more databases (26-30) associated with the server 12, as will be described in greater detail herein.

It should be noted that the server 12 described herein may further be embodied as the integrated supply chain system described in co-pending and co-owned U.S. patent application Ser. Nos. 14/657,552, 14/657,555, 14/657,558, 14/657,562, 14/657,565, each of which was filed on Mar. 13, 2015, the content of each of which are incorporated herein by reference in their entirety.

The network 18 may be any network that carries data. Non-limiting examples of suitable networks that may be used as network 18 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), the most recently published versions of IEEE 802.11 transmission protocol standards as of June 2015, other networks capable of carrying data, and combinations thereof. In some embodiments, network 18 is chosen from the internet, at least one wireless network, at least one cellular telephone network, and combinations thereof. As such, the network 18 may include any number of additional devices, such as additional computers, routers, and switches, to facilitate communications. In some embodiments, the network 18 may be or include a single network, and in other embodiments the network 18 may be or include a collection of networks.

The server 12 is configured to provide an interface with which the one or more users 16(1)-16(n) may interact for the purposes of providing traceability information of a product, or other types of information generally related to the product or supply chain activities or events associated with the product. The server 12 is further configured to provide an interface with which a seller, for example, may interact for the purposes of the assignment, or modification, of a reference to a unique identifier associated with a product at the point of sale or delivery of such product.

For example, the server 12 is configured to communicate and share data with a device associated with one or more users 16 (hereinafter referred to as user device). The user device may be embodied as any type of device for communicating with the server 12 and cloud-based service 14, and/or other user devices over the network 18. For example, at least one of the user devices may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure.

As will be described in greater detail herein, the user device may include an interactive display device configured to provide product information to one or more users upon placement of a product on, or within proximity to, a display surface of the device. The display surface is configured to display a visual output of product information to one or more users upon placement of the product on, or near, the display surface. The interactive display device may include one or more components configured to detect placement of the product in proximity to the display surface, including, but not limited to, one or more digital imaging devices (e.g., digital camera(s), near-infrared (IR) camera(s)), optical sensors (e.g., ambient light sensors, near-IR light sources), touch sensors (e.g., capacitance touchscreen), weight sensors, and the like. The product may generally include a food or beverage product (e.g., coffee) held by a container (e.g., coffee cup or saucer/plate associated with coffee cup). Accordingly, the interactive display device is configured to allow non-conductive physical objects, such as a product container, or object associated with the product container, to be used as input devices.

The interactive display device is further configured to recognize and identify a product within the container based on recognition of a unique identifier associated with the product container. For example, the unique identifier may include a machine-readable identifier label, including, but not limited to, text, graphics, an image, a linear barcode, a matrix barcode, an RFID element, and a combination thereof. In some embodiments, the interactive display device may include a touchscreen display and the unique identifier may include a passive untouched capacitive assembly associated with the product container. Upon recognizing the unique identifier, the interactive display device is configured to display specific product information assigned to the unique identifier to a user via the display surface, wherein the display surface may provide a graphical user interface (GUI) allowing the user to interact with the product information.

The server 12 is configured to receive data provided thereto from one or more users related to a product. The data may be related to supply chain activities/processes of the product, including production and handling of the product, exchanges or transactions involving the product, and transportation and movement of the product through the supply chain. Accordingly, users may have access to product data in real-time or near real-time as the product moves in the supply chain.

In some embodiments, the interface provided by the server 12 may present information related to the product as well as supply chain management to a user 16. The product information may include, but is not limited to, traceability information, general information about the product itself, information about specific activities or processes of the supply chain through which the product has gone through or is scheduled to go through, information about members of the supply chain that may be involved with the product, and the like. The interface may further allow the user to interact with the supply chain management and product information (e.g., filter, sort, access different sets of data, etc.) and further communicate with the server 12 (e.g., provide input data). Accordingly, the user 16 is able to have real-time visibility to product information, such as traceability information of a product (such as information related to current location, any previous location, and next destination, etc.), as well as supply chain management data and tools (e.g., assignment of specific data to a product, assignment of an identifier label to a product, updating of product data, etc.).

Figure 2:
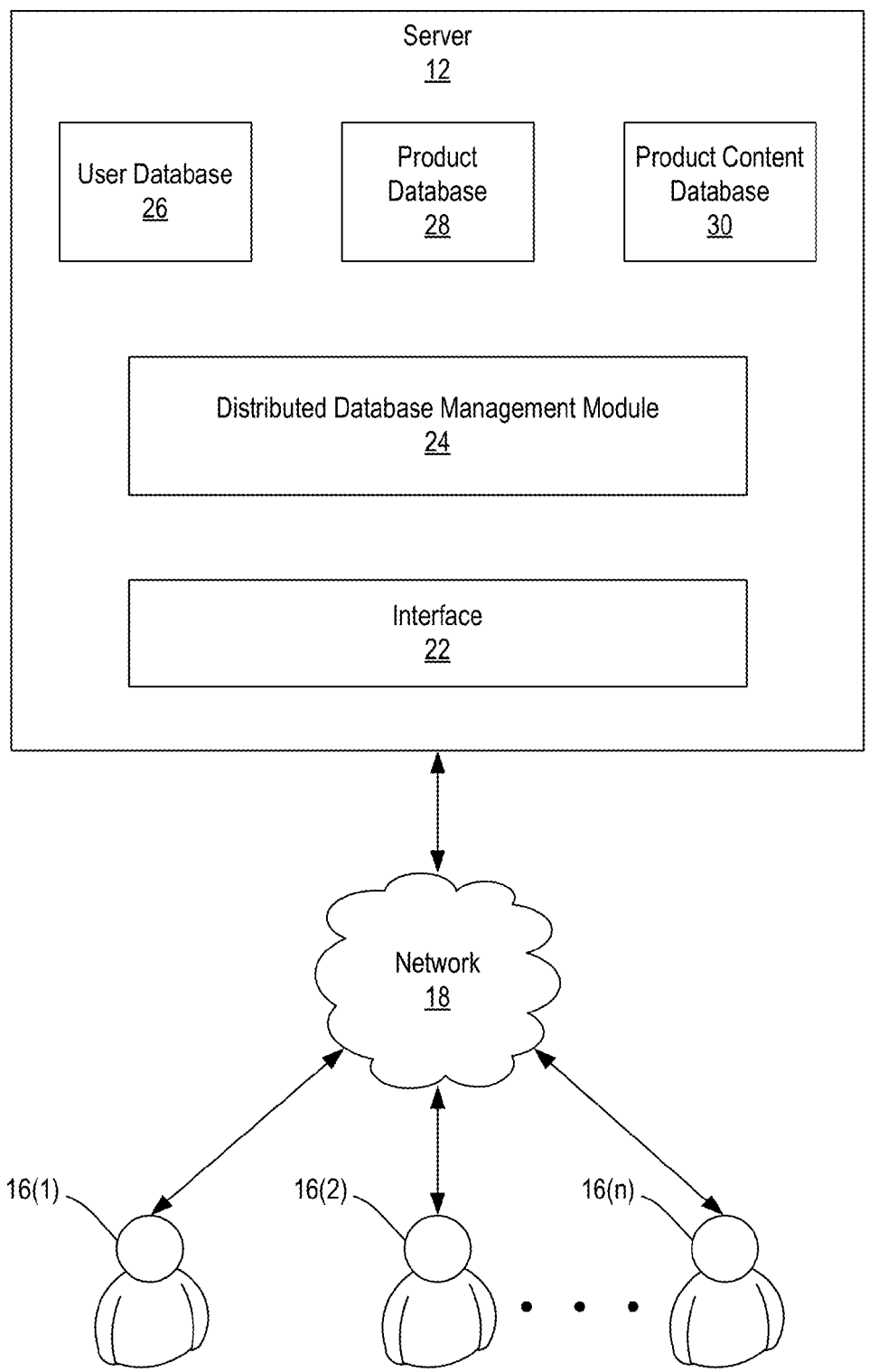
FIG. 2 is a block diagram illustrating the server of FIG. 1 in greater detail.

FIG. 2 is a block diagram illustrating the server 12 of FIG. 1 in greater detail. As shown, the server 12 may include an interface 22, a distributed database management module 24, and various databases for storing data related one or more users and one or more products in the supply chain. For example, the distributed database management module 24 may be configured to communicate and exchange data with a user database 26, a product database 28, and a product content database 30, each of which is described in greater detail herein.

As previously described, the interface 22 may generally allow a user 16 to access and share data with one or more components of the server 12. For example, upon accessing the server 12 on the cloud-based service 14, the interface 22 may be presented to the user on a user device, in which the user may navigate a dashboard or standard platform interface so as to access data related to a specific product. For example, a seller may wish control the type of product information that will be displayed to a consumer via the interactive display device of the present invention. Accordingly, the seller may use the interface 22 for the assignment, or modification, of a reference to a unique identifier associated with a product at the point of sale or delivery of such product. For example, one form of a request may be received from a retailer or seller who wishes to provide product traceability information, as well as other types of information, to a consumer who purchased or is interested in purchasing the product. More specifically, a seller may wish to provide dynamic content to a consumer at the point of sale or delivery, wherein such dynamic content may be specific to details about the specific product sold, the circumstances of the transaction, or the identity of the consumer.

The exchange and handling of data between the server 12 and the users 16, as well as the various databases (26, 28, 30) is generally managed by the distributed database management module 24. The distributed database management module 24 may generally operate according to a distributed data model, in which storage devices (e.g., databases 26-30) are not all attached to a common processing unit. For example, one or more of the databases 26-30 may be stored different computers or servers, located in the same physical location or may be dispersed over a network of interconnected computers. For example, some of the databases 26-30 may be distributed across multiple physical locations, such that they can reside on network servers on the Internet, on corporate intranets or extranets, or on other networks. Accordingly, by storing data across multiple computers, distributed databases can improve performance at end-user worksites by allowing transactions to be processed on many machines, instead of being limited to one. The distributed database management module 24 is configured to manage the exchange of data between users 16 and the server 12 so as to provide traceability of a product as it moves through a supply chain as well as allow supply chain management. The distributed database management module 24 is further configured to manage access to data stored on the various databases 26-30.

For example, as an initial step, a user 16 attempting to gain access to the server 12 may be required to verify that they are registered with or otherwise allowed access to data provided by the server 12. The user database 26 may generally be used for the storage of a profile or account associated with a user. Accordingly, a user 16 may first be prompted to either login to an existing user profile or account stored in the user database 26 or to create a new account or profile. It should be noted, however, that an administrator associated with the server 12 (e.g. a third-party administrator) may have control over user access, determining who may have access and the level of access permitted. Additionally, the administrator may be able create a user profile or account or modify and existing profile or account. A user account or profile may generally include conventional input (e.g., user identity, user location or address, background information, role in supply chain, preferences, login credentials, etc.). It should further be noted that the distributed database management module 24 may further be configured to limit user access to certain data based on user credentials (e.g., role-based access). For example, a farmer may have limited access to the type of supply chain data versus the amount of access provided to a producer in the supply chain. It should be noted that in some instances, a user need not necessarily have an account or profile in order to access specific data. For example, a consumer may not have to be registered with the server 12 in order to access traceability information associated with a product they purchased or are interested in purchasing. Instead, the distributed database management module 24 may be configured to recognize the user's role (e.g., a consumer) and further limit access to traceability data.

The product database 28 may generally be used for the storage of profiles associated with products, wherein each profile includes information related to an identity of a product or unit of product, characteristics of the product or unit of product, location of the product or unit of product, characteristics of the location. The characteristics of the product or unit of product may include, for example, physical attributes of the product or unit of product, origin of the product or unit of product, destination of the product or unit of product, and a combination thereof. Similarly, the characteristics of the location of the product or unit of product may include the operator of the location, overall capacity of the location, current capacity of the location, seasonality of the location, operational status of the location, current weather at the location, and a combination thereof. The product database 28 may further include traceability information related to the product (e.g., origin, destinations, etc.).

The server 12 of the present invention is configured to receive requests from users 16 for the assignment, or modification, of a reference to a unique identifier associated with a product at the point of sale or delivery of such product. For example, one form of a request may be received from a retailer or seller who wishes to provide product traceability information, as well as other types of information, to a consumer who purchased or is interested in purchasing the product. More specifically, a seller may wish to provide dynamic content to a consumer at the point of sale or delivery, wherein such dynamic content may be specific to details about the specific product sold, the circumstances of the transaction, or the identity of the consumer. The dynamic content may be stored in the product content database 30, wherein the seller may have access to such database and can assign or modify the content to be associated with the product sold or to be sold, which is discussed in greater detail herein.

FIG. 3 is a flow diagram illustrating one embodiment of a method 300 for providing product information to a consumer, particularly in a dynamic format. The information to be provided to a consumer may relate to various aspects of a food product, such as specific characteristics of the food product, origin of the food product, as well as who produced it, how it was produced, and information related to the seller of the food product. The method 300 includes correlating a unique identifier that is associated with a product to an identification of the product (operation 310). In one scenario, for example, the product may be a cup of coffee. Accordingly, the present invention allows a seller, at the point of sale, to specifically correlate a unique identifier associated with the cup of coffee to an identification of that coffee. The unique identifier may include, for example, a machine-readable identifier label, such as a barcode, that is already associated with the cup of coffee (e.g., already printed on the coffee cup or a coaster upon which the coffee cup is delivered). In other embodiments, for example, the interactive display device may include a touchscreen display and the unique identifier may include a passive untouched capacitive assembly associated with the coffee cup or coaster.

Correlation may occur by way of a seller computing device configured to communicate and exchange data with the server 12, in a similar manner as the user devices described previously herein. In particular, a seller (e.g., coffee barista) need only utilize the computing device to identify the specific product being sold (specific coffee) and then correlate the unique identifier to the identity of the coffee, such as using the computing device to scan the barcode label on the coffee cup or coaster. Similarly, in the case of a passive untouched capacitive assembly, the seller need only place the cup of coffee (having the passive untouched capacitive assembly) in contact with a touchscreen display of the computing device for identification of the product being sold, at which point the seller can then correlate the unique identifier with the coffee.

The method 300 further includes transmitting the correlation of the unique identifier associated with the product and the identification of the product to a server (operation 320). The server includes a database that stores a plurality of different and separate product content references about the product. The plurality of different and separate product content references may be stored in the product content database 30, for example, wherein the seller may have access to such database and can assign or modify the content to be associated with the product sold or to be sold. The plurality of different and separate product content references may include, for example, one or more product information links (e.g., uniform resource locator (URL)) directed to informational data associated with the product. In some embodiments, some of the product content references may include a URL that is directed to one or more other URLs associated with other product content references, which will be described in greater detail herein. Additionally, or alternatively, the plurality of different and separate content references may include other sources of informational data and need not be limited to web-based data. For example, in some embodiments, in addition to, or alternatively, the content references may include one or more data files, including media files (e.g., text, images, video, audio, etc.) having information associated with the product.

As previously described, the product generally refers to a food or beverage product held, or otherwise contained, within a container, such as a coffee product provided within a cup, or food on a plate. Furthermore, the product may have multiple components, such as one or more add-ins for the coffee (e.g., milk, cream, sugar, sweetener, etc.). Accordingly, the plurality of different and separate content references may include informational data associated with one or more of these components, such as the coffee itself, and, in some instances, the one or more add-ins included in the cup of coffee.

In this manner, the plurality of different and separate product content references can be modified on the fly so as to account for details associated with the product at the point of sale or delivery, including characteristics of the individual unit of product sold or delivered, as well as the different components of the product (e.g., coffee, cream, sugar, etc.), the circumstances surrounding the transaction, as well as characteristics of the seller or consumer, while still providing traceability of that product. Accordingly, the systems and methods of the invention are able to provide comprehensive traceability of a product and other relevant information in a dynamic format.

The method 300 further includes use of an interactive display device, which serves as a both a physical means for providing a surface for supporting the product (e.g., serves as a top for a bar, coffee table, dining table, etc.) as well as a means for displaying informational data associated with the product with which the user may interact. Some exemplary interactive surface computing platforms may include, for example, Microsoft's SURFACE, Microsoft's and Samsung's SUR40 (utilizing Microsoft's PIXELSENSE programming), Apple's IPAD, and other multi-point input detection and recognition computing devices having either optical or touch sensing software, or both.

Accordingly, upon purchasing the coffee product, a consumer may then utilize the interactive display device to both rest their cup of coffee upon and to further view and interact with information related to their purchased product. For example, the method 300 includes recognizing that the product has been placed on a display surface of an interactive display device (operation 330) and recognizing the unique identifier that is associated with the product (operation 340). The interactive display device may include one or more components configured to detect placement of the product upon the display surface and further recognize the unique identifier associated with the product. For example, the interactive display device may include one or more digital imaging devices (e.g., digital camera(s), near-infrared (IR) camera(s)), optical sensors (e.g., ambient light sensors, near-IR light sources), touch sensors (e.g., capacitance touchscreen), weight sensors, and the like. In the instance that the unique identifier is a barcode label, the display device may include a barcode scanner configured to read the barcode label. Similarly, in the instance that the unique identifier is a passive untouched capacitive assembly, the display device may include one or more touch sensors defining a touchscreen display and configured to detect the passive untouched capacitance assembly.

The method 300 further includes generating a request for information regarding the product based on the recognition of the unique identifier that is associated with the product and transmitting the request to the server (e.g., server 12) (operation 350). The interactive display device is configured to communicate and exchange data with the server 12 via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards as of June 2015, and a combination thereof.

The method 300 further includes receiving one of the different and separate product content references assigned to the product from the server in response to the request (operation 360) and displaying informational data associated with the product content reference to a user via the display surface (370). Upon receiving the product content reference assigned to the unique identifier associated with the product, the interactive display device is configured to display informational data related to the product, as determined by the unique identifier, to a user via the display surface. The interactive display device may generally provide a graphical user interface (GUI) on the display surface, thereby allowing the user to interact with the product information. For example, the product information may displayed in a specific pattern relative to the physical product container (e.g., coffee cup, coaster, saucer, plate, etc.), such as, for example, a spoke-hub pattern providing various options arranged and displayed along a perimeter of the product container. The different options may include, but are not limited to, product identity and preparation notes (e.g. type of coffee and origin), product characteristics and details (e.g., tasting notes, varietals, production methods, etc.), text, images or video files (e.g., images or video of a tour of the coffee estate, coffee production including specific supply chain processes, etc.), interactive maps or routes tracing origin and transactions (e.g., interactive origin map including pins and pathways tracing the route of the coffee from the cherry to the coffee shop), articles or publications related to product, and a dynamic stream of product content (e.g., social-media feed method including dynamic timeline or story related to product).

In some embodiments, final consumers may access the server 12 through user accounts and register their ownership of product units they acquire. This data may be shared with other users of the system, according to privileges the consumer may grant. Users may share this information with friends, or with fellow members of an organization, or with sellers. Accordingly, the server 12 is configured to allow consumers to assert claims of ownership, thereby creating links between their user account in the user database 26 and the product they purchased within the product database 28.

While FIG. 3 illustrates method operations according one embodiment, it is to be understood that in any embodiment not all of these operations are necessary. Indeed, it is fully contemplated herein that in other embodiments of the present disclosure, the operations depicted in FIG. 3 may be combined in a manner not specifically shown in any of the drawings, but still fully consistent with the present disclosure. Thus, claims directed to features and/or operations that are not exactly shown in one drawing are deemed within the scope and content of the present disclosure.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Figure 4:
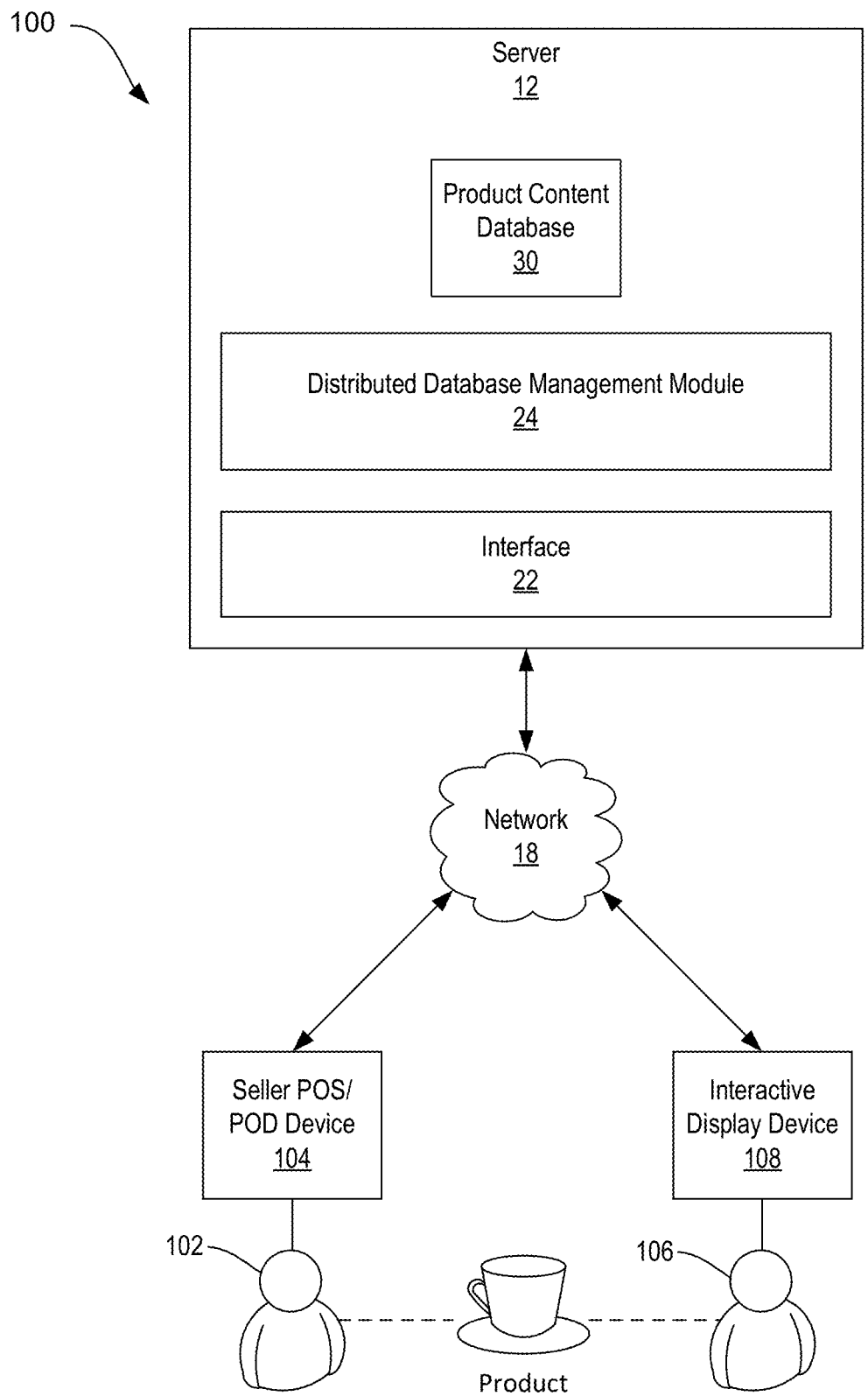
FIG. 4 is a block diagram illustrating an exemplary system for providing product information to a user, particularly in a dynamic format.

FIG. 4 is a block diagram illustrating an exemplary system 100 for providing product information to a user, particularly in a dynamic format in accordance with the method 500 previously described herein. The system 100 may generally be provided in a seller/buyer scenario, such as at a retail level in which a seller 102 is providing a product for sale and the buyer 106 is either purchasing or contemplating purchase of the product. As shown, the system 100 is configured to allow the seller 102 to define product variations and assign references to the product at the point of sale or delivery. It should be noted that the terms "variations" and "product content references" may be used interchangeably herein.

The system 100 allows the seller 102 to assign or modify a reference associated with a unique identifier associated with a product at the point of sale or delivery, thereby changing the information delivered to the buyer 106 based on details about the specific unit sold, the circumstances of the transaction, as well as the identity of the buyer 106. These details are often not known until the point of sale or delivery, when it is generally not be feasible to re-print a label or re-tag merchandise. In that manner, the present system 100 allows sellers of products and services to define and manage variations of a product or of a transaction that may be significant to themselves or their customers; then, at the point of sale or delivery, they may associate information specific to these variations with the physical product or service.

As shown, the system includes a seller point of sale (POS)/point of delivery (POD) device 104 associated with the seller 102 and an interactive display device 108 generally associated with the buyer or consumer 106. The POS/POD device 104 and interactive display device 108 are generally embodied as computing devices configured to communicate and exchange information with the server 12, in a similar manner as the user devices described previously herein. Accordingly, the POS/POD and interactive display devices 104, 108 may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure.

In the present scenario, the POS/POD device 104 may include, or otherwise be tied to, a computing system for processing and completing a transaction, such as a purchase of the product. Accordingly, the POS/POD device 104 may include a sales register, including other peripherals such as a receipt printer, barcode scanner, and the like. As generally understood, the seller computing device may be part of the register or other computing device for recording a sale of a product. For example, upon making a purchase (e.g., seller processes sale on register), the register (e.g., seller device) is configured to communicate with the server 12 and thereby exchange data with the product content database 30.

The POS/POD device 104 may include a particular software application configured to allow the seller 102 to communicate with at least the product content database 30 of the server 12 for requesting, creating, modifying, deleting, or otherwise managing a set of variations to provide to the consumer 106 for providing informational data related to the product. For example, the seller 102 may, by way of variation software on their POS/POD device 104, define and manage a set of variations related to one or more products or transaction types and further associate with each such definition a unique information address of the sort used to retrieve information over a public communication network, such as the Unique Resource Locator (URL) commonly used to access information via the network 18. Subsequently, at the point of sale or delivery, the seller 102 may use the same or a related software application to access and select one of these pre-defined variations. At this point, the seller 102 may also have a means of accessing and applying key information about the consumer 106 to the transaction, such as a consumer's name, or a unique identity code associated with the consumer 106, or the name or identity of an associated group. Provided with such inputs, the POS/POD device 104 may retrieve a corresponding information address, incorporating buyer information as available, and transmit and store this information.

Accordingly, the POS/POD device 104 may include any computing device having basic computing hardware/software for allowing a seller 102 to communicate and exchange information (e.g., data) with the server 12, in manners described herein. For example, the POS/POD device 104 is generally understood to include a processor, a memory, an input/output subsystem, communication circuitry, data storage, peripheral devices, and one or more sensors. The peripheral devices may include a touch-sensitive display (also known as "touch screen" or "touchscreen"). Accordingly, in addition to providing a user interface with which the seller 102 may interact to provide user input, the touchscreen display, in conjunction with additional sensors within the device 104, may be configured to recognize that the product has been placed on, or in proximity to, the display surface and further recognize the unique identifier associated with the product. For example, the POS/POD device 104 may include one or more sensors, including, but not limited to, digital imaging devices (e.g., digital camera(s), near-infrared (IR) camera(s)), optical sensors (e.g., ambient light sensors, near-IR light sources), touch sensors (e.g., capacitance touchscreen), weight sensors, and the like, for detecting the presence of the product on the display surface and further reading, or otherwise, recognizing the unique identifier. In the instance that the unique identifier is a barcode label, the device 104 may include a barcode scanner configured to read the barcode label. In the instance that the unique identifier is an RFID label, the device 104 may include an RFID reader configured to read the label. Similarly, in the instance that the unique identifier is a passive untouched capacitive assembly, the touchscreen of the device 104 may include one or more touch sensors defining the touchscreen display and configured to detect the passive untouched capacitance assembly.

In some instances, traceability data or product content data may be exchanged with third-party providers who either produce or consume traceability data. For example, the server 12 may communicate with such third-party providers to acquire or deliver traceability data related to product units registered in the product database 28, or product content data related to products registered in the product content database 30. Such exchange of data may take the form of non-real-time transfers of quantities of data into or out of the server 12, or they may take the form of real-time data transfers of small quantities of data that may be required to service individual requests on a real-time basis. Relative to such use, the invention incorporates a published protocol describing data exchange formats, as well as methods and systems for connecting to external data sources, acquiring data electronically, and parsing and processing received data.

As shown in FIG. 4, the seller 102 is able to access and communicate with the product content database 30 by way of the server 12. In turn, the seller 102 may gain access to a variation repository equipped with data storage capacity sufficient to create, retrieve, update, and delete records describing the individual variations. At any point (e.g., during a transaction, prior to a transaction, or after a transaction) the seller 102 is able to define one or more variations (VAR1-VAR3) and store them in the variation repository. The variations are generally associated with products or services. The variations may be associated with different physical properties of a product, such as size or color, or with the variety or provenance of an ingredient used in a prepared food product. They may also describe properties related to the specific transaction, such as the identity of the consumer or seller. In each case, each of the variations will generally be tied to, or otherwise associated with, at least one product information links (e.g., uniform resource locator (URL)) directed to web-based informational data associated with the product. Additionally, or alternatively, in some embodiments, a variation may be tied to a URL that is directed to one or more other URLs associated with other variations. Accordingly, a first URL on a pre-printed label may reference a second URL stored within the database, where the second URL may be modified at the POS to reference the product informational data. Thus, a pre-printed, or static label, can be used to deliver dynamic content.

The seller 102 may be provided with an interface via their POS/POD device 104 in which the seller 102 may interact with for the management of variations. For example, a seller 102 may be able to specify details of a variation including, but not limited to, a descriptive name for the variation and a URL referencing a body of online resources the seller 102 intends to deliver to the consumer 106. The URL may include one or more placeholders for specific information accessed and entered at the point of sale. When the seller 102 signals completion of their created or modified variation, the variation input data can be transmitted to the product content database 30 generally in a compatible data exchange format, such as JSON. Upon receipt of the data, the product content database 30 may perform validation checks and then package the variation data in a database query format. Upon passing validation, the product content database 30 may then transmit the data to the variation repository, where variation data may be stored as a record, which may be accessible by a unique identifier within the repository. The seller 102 may have an account with the server 12 (e.g., stored in the user database 26) such that variations stored in the variation repository may be tied to the seller's account in the user database 26. Accordingly, upon successfully presenting credentials and gaining access to the server 12, the server 12 is configured to recognize the seller and further provide access to the seller's variations.

At the point of sale or delivery of the product, the seller 102 is able to select one of the variations previously stored for assignment to a unique identifier associated with a product. For example, during the transaction process (e.g., ringing up a sale of the product at the register), the POS/POD device 104 may allow the seller to assign a variation from a list of variations to a unique identifier associated with the product being sold. For example, in one scenario, the product may be a cup of coffee. Accordingly, the present invention allows a seller, at the point of sale, to specifically correlate a unique identifier associated with the cup of coffee to an identification of that coffee. The unique identifier may include, for example, a machine-readable identifier label, such as a barcode, that is already associated with the cup of coffee (e.g., the barcode label is already printed upon the coffee cup). It should be noted that other objects associated with the coffee cup may include a unique identifier label. For example, a saucer, coaster, or plate, or other object to be used with the cup of coffee, may include the unique identifier. It should further be noted that, in other embodiments, the unique identifier may include a passive untouched capacitive assembly, as will be described in greater detail herein.

Correlation may occur by way of a seller computing device configured to communicate and exchange data with the server 12, in a similar manner as the user devices described previously herein. In particular, a seller (e.g., coffee barista) need only utilize the POS/POD device 104 to identify the specific product being sold (specific coffee) and then correlate the unique identifier to the identity of the coffee (e.g., utilize barcode reader to scan the barcode label on the coffee cup or coaster and then assign variation from product content database 30 to the barcode label).

Additionally, or alternatively, at the point of sale or delivery of the product, the seller 102 may also be able to define a new variation according to the particular circumstances of that transaction. The seller 102 may also acquire or access an identifier associated with the consumer 106. For example, in delivering a cappuccino to a consumer 106 in a coffee shop, a barista may select one of a plurality of different variations available according to the specific type of coffee used to prepare the beverage, and then scan a buyer identity code presented by the consumer 106.

Figure 5:
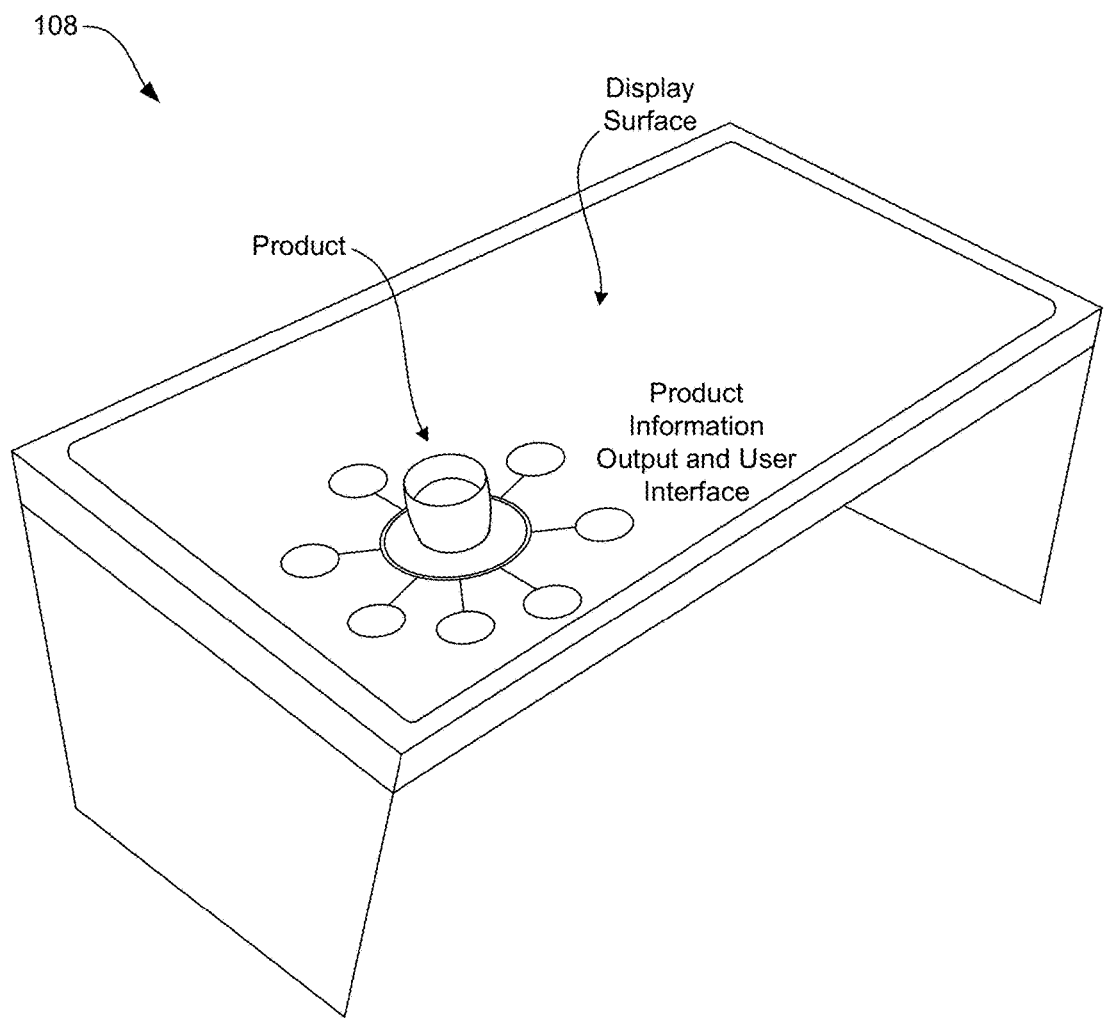
FIG. 5 is a perspective view of an exemplary embodiment of an interactive display device for displaying product information to a user in an interactive format.

In the current scenario, the interactive display device 108 is generally a computing device configured to provide product information to one or more users upon placement of a product on a display surface of the device. FIG. 5 is a perspective view of an exemplary embodiment of an interactive display device 108 consistent with the present disclosure. As previously described herein, the interactive display device 108 may serve as a both a physical means for providing a surface for supporting the product (e.g., serves as a top for a bar, coffee table, dining table, etc.) as well as a means for displaying informational data associated with the product with which a user (e.g., consumer) may interact. Accordingly, upon purchasing the coffee product, a consumer may then utilize the interactive display device 108 to both rest their cup of coffee upon the display surface and further view information about their coffee via an interactive interface displayed on the display surface.

The interactive display device 108 is configured to recognize that the cup of coffee has been placed on the display surface and further recognize the unique identifier associated with the cup of coffee. For example, the interactive display device 108 may include one or more sensors, including, but not limited to, digital imaging devices (e.g., digital camera(s), near-infrared (IR) camera(s)), optical sensors (e.g., ambient light sensors, near-IR light sources), touch sensors (e.g., capacitance touchscreen), weight sensors, and the like, for detecting the presence of the cup of coffee on the display surface and further reading, or otherwise, recognizing the unique identifier. In the instance that the unique identifier is a barcode label, the display device may include a barcode scanner configured to read the barcode label. Similarly, in the instance that the unique identifier is a passive untouched capacitive assembly, the display device may include one or more touch sensors defining a touchscreen display and configured to detect the passive untouched capacitance assembly.

The interactive display device 108 is then configured to communicate with the server 12 and transmit a request for information regarding the cup of coffee based on the recognition of the unique identifier. In response to the request, the interactive display device 108 is configured to receive variation data assigned to the specific unique identifier and further display informational data associated with the variation to a consumer via the display surface. The interactive display device 108 may generally provide a graphical user interface (GUI) on the display surface, thereby allowing the user to interact with the product information. For example, the product information may displayed in a specific pattern relative to the physical product container (e.g., coffee cup, coaster, saucer, plate, etc.), such as, for example, a spoke-hub pattern providing various options arranged and displayed along a perimeter of the product container. The information to be provided to a consumer may relate to various aspects of a food product, such as specific characteristics of the food product, origin of the food product, as well as who produced it, how it was produced, and information related to the seller of the food product.

Figure 6:
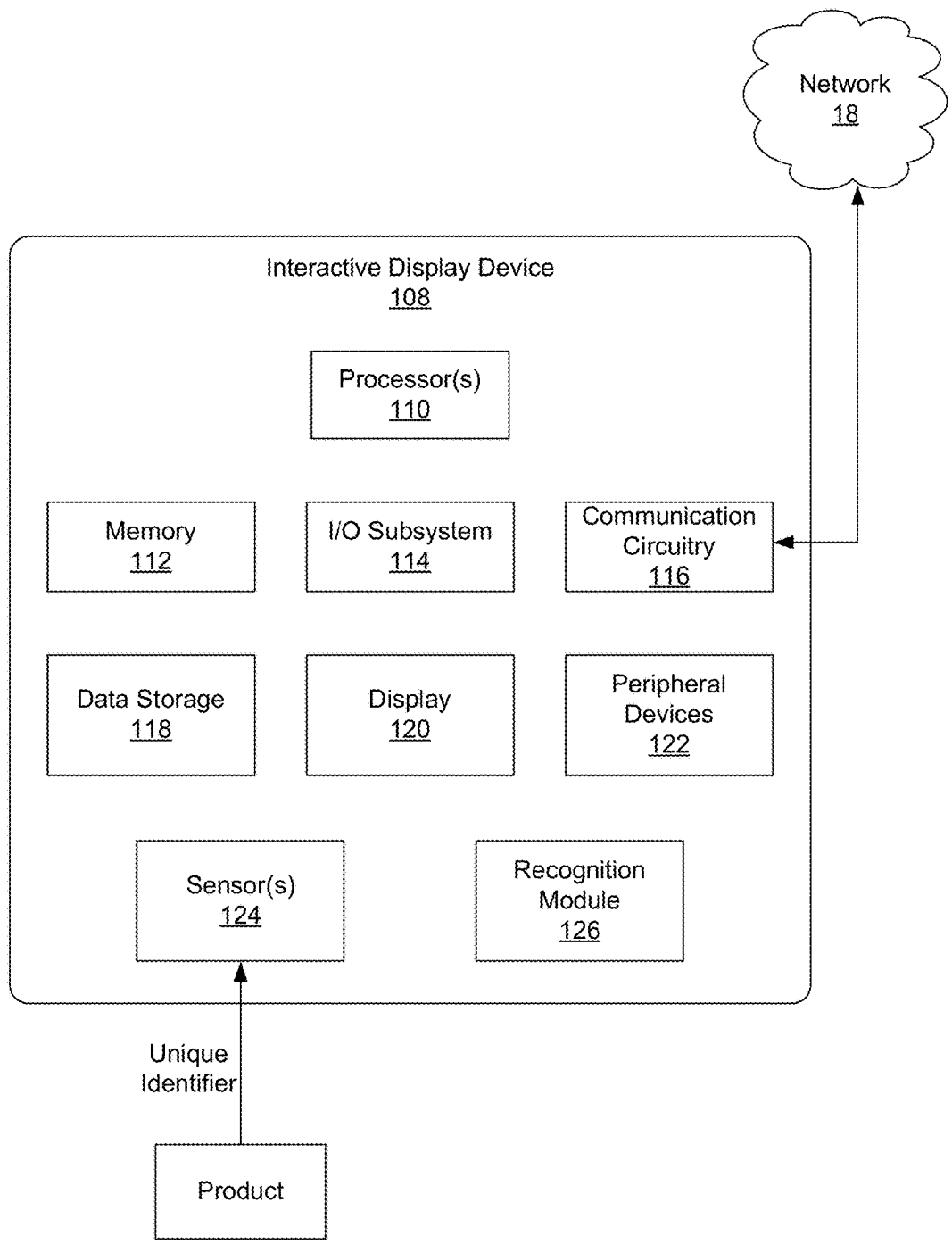
FIG. 6 is a block diagram illustrating the interactive display device of FIG. 5 in greater detail.

FIG. 6 is a block diagram illustrating the interactive display device 108 in greater detail. As shown, the interactive display device 108 includes a processor 110, a memory 112, an input/output subsystem 114, communication circuitry 116, data storage 118, an interactive display 120, peripheral devices 122, one or more sensors 124, and recognition module 126. As generally understood, the interactive display device 108 may include fewer, other, or additional components, such as those commonly found in conventional computer systems. Additionally, in some embodiments, one or more of the illustrative components may be incorporated in, or otherwise from a portion of, another component. For example, the memory 112, or portions thereof, may be incorporated into the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 112 may be embodied as any type of volatile or non-volatile memory or data storage capable of performing the functions described herein. In operation, the memory 112 may store various data and software used during operation of the interactive display device 108, such as operating systems, applications, programs, libraries, and drivers. The memory 112 is communicatively coupled to the processor 110 via the I/O subsystem 114, which may be embodied as circuitry and/or components to facilitate input/output operations with the processor 110, the memory 112, and other components of the device 108. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 110, the memory 112, and other components of the device 108, on a single integrated circuit chip.

The communication circuitry 116 of the device 108 may be embodied as any communication circuit, device, or collection thereof, capable of enabling communications between the interactive display device 108 and at least one of the POS/POD device 104 and the server 12 via the network 18. The communication circuitry 116 may be configured to use any one or more communication technology and associated protocols, as described above, to effect such communication. For example, the communication circuitry 116 may be configured to communicate and exchange data with at least one of the POS/POD device 104 and server 12 via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards as of June 2015, and a combination thereof.

The data storage 118 may be embodied as any type of device or devices configured for short-term or long-term storage of data such as, for example, memory devices and circuits, memory cards, hard disk drives, solid-state drives, or other data storage devices. In the illustrated embodiment, the device 108 may maintain one or more application programs, databases, media and/or other information in the data storage 108. As described in greater detail herein, one or more applications related to graphical user interface for providing product information and user interaction with such information, including the specific arrangement, design and desired output of product information, may be stored in the data storage 118 and utilized by the interactive display device 108 for controlling output of the product information on the interactive display 120.

The interactive display 120 may generally be embodied as a touch-sensitive display (also known as "touch screen" or "touchscreen"). The interactive display 120 may include a capacitive touchscreen configured to receive multi-point input and detect touch events based on changes in an electrical field of the display. As generally understood, a capacitive touchscreen may include an insulator, such as glass, coated with a transparent conductor, such as indium tin oxide. Upon contact with an electrically conductive object (e.g., human finger), touching the surface of the screen results in a distortion of the screen's electrostatic field, measurable as a change in capacitance. The change in capacitance may be registered and the location of the touch event may be determined by the processor 110 and may then be used for interaction with the displayed user interface on the display 120.

Additionally, or alternatively, the interactive display 120 may be embodied as an infrared touchscreen, utilizing an array of X-Y infrared LED and photodetector pairs to detect a disruption in the pattern of LED beams. These LED beams may cross each other in vertical and horizontal patterns, thereby assisting the sensors to pick up the exact location of a touch input. A major benefit of such a system is that it can detect essentially any input including a finger, gloved finger, stylus or pen. For example, the display 120 may include an infrared (IR) back light unit providing light through one or more layers of optical sheets, LCD, and/or protection glass. Upon contacting an object placed on the display 120 (e.g., finger, hand, passive object, etc.), the light is reflected back and sensed by integrated sensors (one or more sensors 124), which are configured to convert the light signal into an electrical signal/value. Such electrical signals/values are then used to render an image of the object on the display, wherein the image is analyzed using image processing techniques and the identity of the object may then be determined.

The peripheral devices 122 may include one or more devices for interacting with the device 108 (in addition to the touchscreen display), including a keypad, a microphone, or other input devices. Accordingly, a user may utilize the peripheral devices 122 for interacting with a GUI provided on the display 120 for selection of options of product information.

The sensors 124 may be configured to sense or detect contact between an object and the display 120 and further recognize a unique identifier that is associated with the object. For example, the sensors 124 may include, but are not limited to, one or more digital imaging devices (e.g., digital camera(s), near-infrared (IR) camera(s)), optical sensors (e.g., ambient light sensors, near-IR light sources), touch sensors (e.g., capacitance touchscreen), weight sensors, and the like. The sensors 124 may be useful in the detection of both electrically conductive objects (e.g., human finger, hand, etc.) and passive objects (e.g., non-electrically conductive objects such as a coffee cup). In the examples described herein, the sensors 124 are configured to detect placement of a coffee cup, or other object associated with the coffee cup (e.g., coaster, saucer, plate), upon the display 120. Accordingly, the interactive display device 108 is configured to allow non-conductive physical objects, such as a product container, or object associated with the product container, to be used as input devices.

The recognition module 126 is configured to receive and analyze data captured by one or more of the sensors 124 to determine user input as a result contact between the object and the display 120. For example, the recognition module 126 may be configured to receive data captured by a digital camera, wherein the data includes a digital rendering of a barcode label affixed to the coffee cup. Upon analyzing the data, the recognition module 126 may be configured to identify the unique data associated with the barcode label. Accordingly, the recognition module 126 may include custom, proprietary, known and/or after-developed barcode reading code (or instructions sets) that are generally well-defined and operable to receive barcode input and identify unique data associated with the barcode label, which may then be used for retrieving a specific variation assigned to the unique identifier.

In another example, the recognition module 126 may be configured to receive touch data from one or more touch sensors and may be configured to identify a touch event based on the touch data. The recognition module 126 may include custom, proprietary, known and/or after-developed touch detection code (or instruction sets) that are generally well-defined and operable to receive touch data and to identify a touch event. The touch event may correspond to a unique identifier associated with the cup of coffee, which may then be used for retrieving a specific variation assigned to the unique identifier.

Upon recognizing a unique identifier of an object placed on the display 120, the interactive display device 108 is configured to communicate with the server 12 via the communication circuitry 116 and transmit a request for information regarding the cup of coffee based on the recognition of the unique identifier. In response to the request, the interactive display device 108 is configured to receive variation data assigned to the specific unique identifier and further display informational data associated with the variation to a consumer via the interactive display 120. The interactive display device 108 may generally provide a graphical user interface (GUI) on the display 120, thereby allowing the user to interact with the product information. For example, the product information may displayed in a specific pattern relative to the physical product container (e.g., coffee cup, coaster, saucer, plate, etc.), such as, for example, a spoke-hub pattern (see FIG. 5) providing various options arranged and displayed along a perimeter of the product container. The different options may include, but are not limited to, product identity and preparation notes (e.g. type of coffee and origin), product characteristics and details (e.g., tasting notes, varietals, production methods, etc.), text, images or video files (e.g., images or video of a tour of the coffee estate, coffee production including specific supply chain processes, etc.), interactive maps or routes tracing origin and transactions (e.g., interactive origin map including pins and pathways tracing the route of the coffee from the cherry to the coffee shop, articles or publications related to product, and a dynamic stream of product content (e.g., social-media feed method including dynamic timeline or story related to product).

Figure 7:
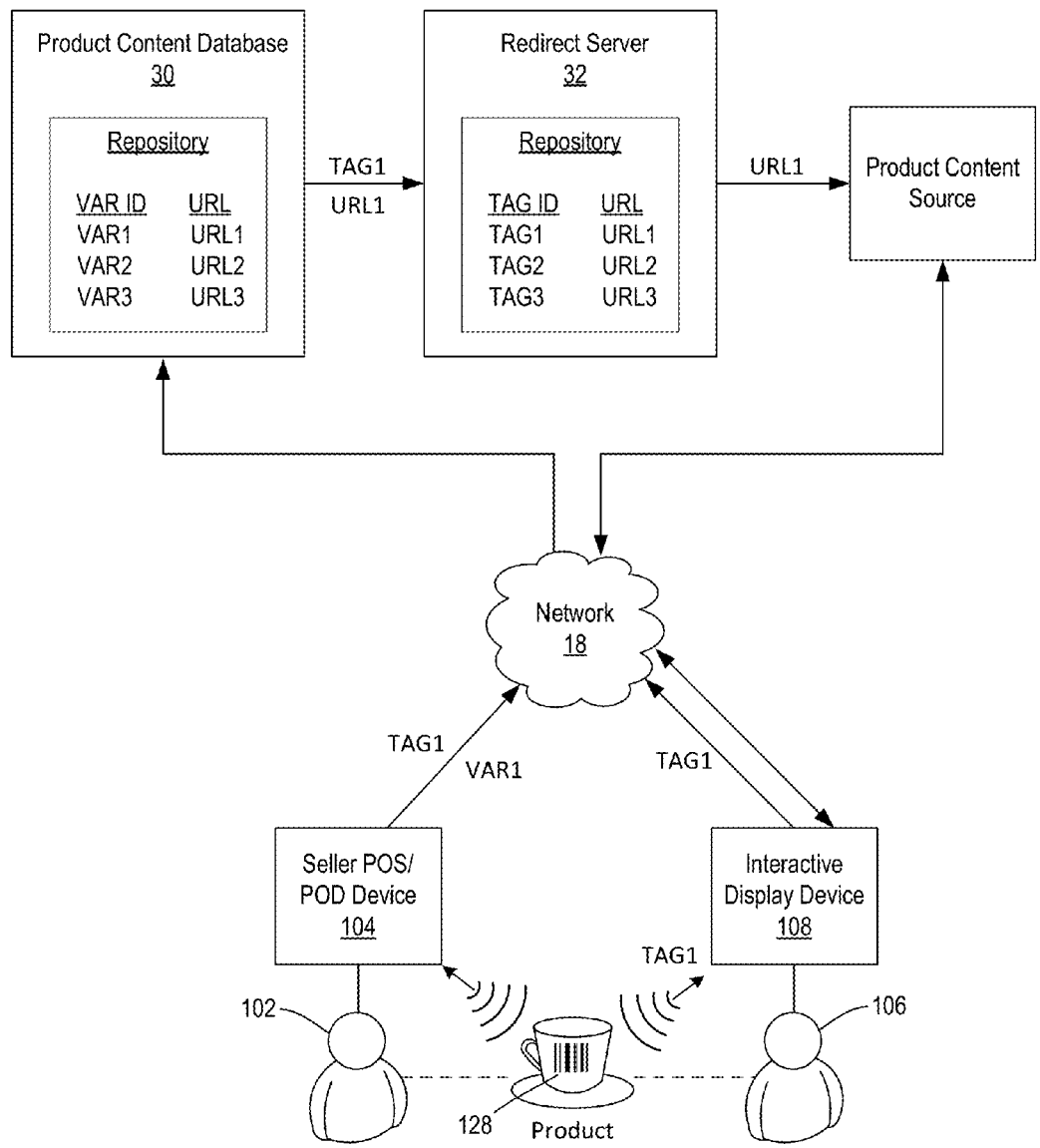
FIG. 7 is a block diagram illustrating an embodiment of the system of FIG. 4 for providing product information to a user via a machine-readable unique identifier label associated with the product.

FIG. 7 is a block diagram illustrating an embodiment of the system 100 of FIG. 4 for providing product information to a user via a machine-readable unique identifier label 128 associated with the product. As shown, the transfer of variation data from a seller's POS/POD device 104 to the interactive display device 108 may be transmitted via a read-only device, such as an identifier label, a barcode or other graphic device or pattern, affixed to a product, product packaging, or serving vessel. The seller's POS/POD device 104 is provisioned with a reader capable of scanning or imaging the barcode tag 128 retrieve a unique identifier encoded therein, designated as TAG1. The seller 102 may initiate a transaction by scanning the barcode from a serving vessel or package to retrieve the identifier TAG1, and by selecting a variation identifier VAR1 to associate with this unique identifier. The POS/POD device 104 transmits the selected variation identifier VAR1 together with the barcode identifier TAG1, to the product content database 30 over the network 18. Upon receiving VAR1 and TAG1, the product content database 30 is configured to initiate a transaction with the variation repository to retrieve the URL associated with the variation identifier VAR1. Upon successful lookup, the product content database 30 is configured to transmit TAG1 and URL1 to a redirect server 32. Upon receiving the TAG1 and URL1 pair, the redirect server 32 initiates a transaction with a redirect repository. The redirect repository receives TAG1 and URL1 and stores them together in a relational association, thereby effectively correlating the selected variation to the unique identifier (e.g., the barcode label 128).

Subsequently, the consumer 106 may then use the interactive display device 108, which may be equipped with a barcode reader or imaging capability (e.g., barcode scanning application), to scan the barcode label 128 on the serving vessel or packaging and retrieve the unique identifier TAG1. For example, a consumer may place their cup of coffee on the display surface of the display device 108, at which point, one or more sensors 124 are configured to detect the presence of the cup of coffee and further recognize the barcode label 128. The encoded contents of TAG1, in addition to the unique tag identifier, also include the address of the redirect server 32. Thus, the interactive display device 108, upon scanning the barcode label 128, may transmit TAG1 by means of conventional information retrieval software, such as a web browser, to the redirect server 32. Upon receipt of TAG1 from the interactive display device 108, the redirect server 32 transmits TAG1 in the form of a query to the redirect repository. The redirect repository, upon receipt of the query, uses TAG1 as an index to retrieve the associated URL1 from the repository. The redirect server 32 is then configured to transfer the request transaction to the product content source referenced by URL1. The transfer of the request may be accomplished by means of conventional network protocols recognized by network-based information services, such as HyperText Transfer Protocol (HTTP). Upon receipt of the transferred request, the product content source is configured to access the target information intended by the seller and to provide such target information to the interactive display device 108 for presentation to the consumer 106 via the display surface of the device by conventional information viewer, such as a web browser or the like.

In some embodiments, in addition, or alternatively, to a machine-readable label, the unique identifier may include a passive untouched capacitive assembly. FIG. 8 is a perspective view of a passive untouched capacitive assembly 130 couplable to a product container and serving as a unique identifier for the product. FIG. 9 is a bottom view of the passive untouched capacitive assembly 130. The assembly 130 is configured to be coupled to a product container (e.g., coffee cup, saucer, coaster, plate, etc.) and make contact with a capacitive touchscreen display of the device 110 and serve as the unique identifier that is associated with the coffee. The assembly 130 generally includes a base 132 having two or more electrically conductive nibs 134 protruding therefrom and configured to make contact with the display surface of the interactive display device 108. The assembly 130 is passive in that it requires no built-in active electronics and is able to be detected by one or more touch sensors on the display without the need for human contact. The nibs 134 essentially act as contact points on the underside of the base 132, wherein the nibs 134 each include a conductive material. The nibs 134 are arranged in such a pattern so as to communicate the particular ID of the assembly 130, the position, rotation and possibly other operational parameters (like slider positions or button presses) to the underlying touchscreen display. Thus, similar to a barcode label, the assembly 130 may serve as a unique identifier by providing a unique touch pattern when placed on the display surface of the interactive display device 108.

Accordingly, the seller 102 may have a plurality of assemblies 130, each of which may be either integrally formed with a product container (e.g., underside of a cup of coffee (or coaster, saucer, plate, etc.) or releasably coupled to (e.g., magnetic means or the like), or otherwise paired with, the product container. At the point of sale, a barista may utilize the POS/POD device 104 to assign the specific assembly 130 with a variation from the product content database 30. In some embodiments, this will be effected by touching the assembly to a touch-sensitive surface of the POS/POD device 104. In turn, upon a consumer placing the assembly 130 upon the display surface of the interactive display device 108, the unique touch pattern associated with the assembly 130 is recognized by one or more touch sensors and such touch data is then used to retrieve the specific variation associated therewith.

FIG. 10 is a perspective view of placement of the passive untouched capacitive assembly 130 upon the display surface of the interactive display device 108. As shown, upon placement on the display, the interactive display device 108 is configured to detect and further recognize a touch pattern of the assembly 130, as indicated by the touch data points 136. As previously described, each assembly 130 has a specific touch pattern associated therewith so as to provide differentiation between assemblies 130, thereby allowing a first assembly providing a first unique identifier to be associated with a first product (coffee 1) and a second assembly providing a second unique identifier, different than the first unique identifier, to be associated with a second product (coffee 2). Each assembly 130 may have a unique touch pattern based on, for example, the particular arrangement of nibs 134 along the base 132, the number of nibs 134 included, the size of the nibs 134, the size of the base 132, and the like.

The use of multiple nibs 134 allows the assembly to be detected without the need to be grounded or touched by a user. For example, the assembly 130 utilizes the capacitive coupling to a second area on the display as ground through the inclusion of multiple nibs 134 that are electrically connected to each other, thus causing currently active intersections on the touchscreen display to be coupled to other, currently inactive intersections that serve as ground. It should be noted that only two nibs 134 may be necessary in order to elicit a touch event and detection by the touch sensors of the interactive display device 108. However, the use of three or more nibs 134 may be preferable. The concept behind the detection of the assembly 130 via at least two or more contact points is described for example in S. Voelker et al., "PUCs: Detecting Transparent, Passive Untouched Capacitive Widgets on Unmodified Multi-touch Displays", Proceedings of the adjunct publication of the 26th annual ACM symposium on User interface software and technology, Oct. 8-11, 2013, St. Andrews, Scotland, United Kingdom, the content of which is incorporated by reference herein in its entirety.

Figure 11:
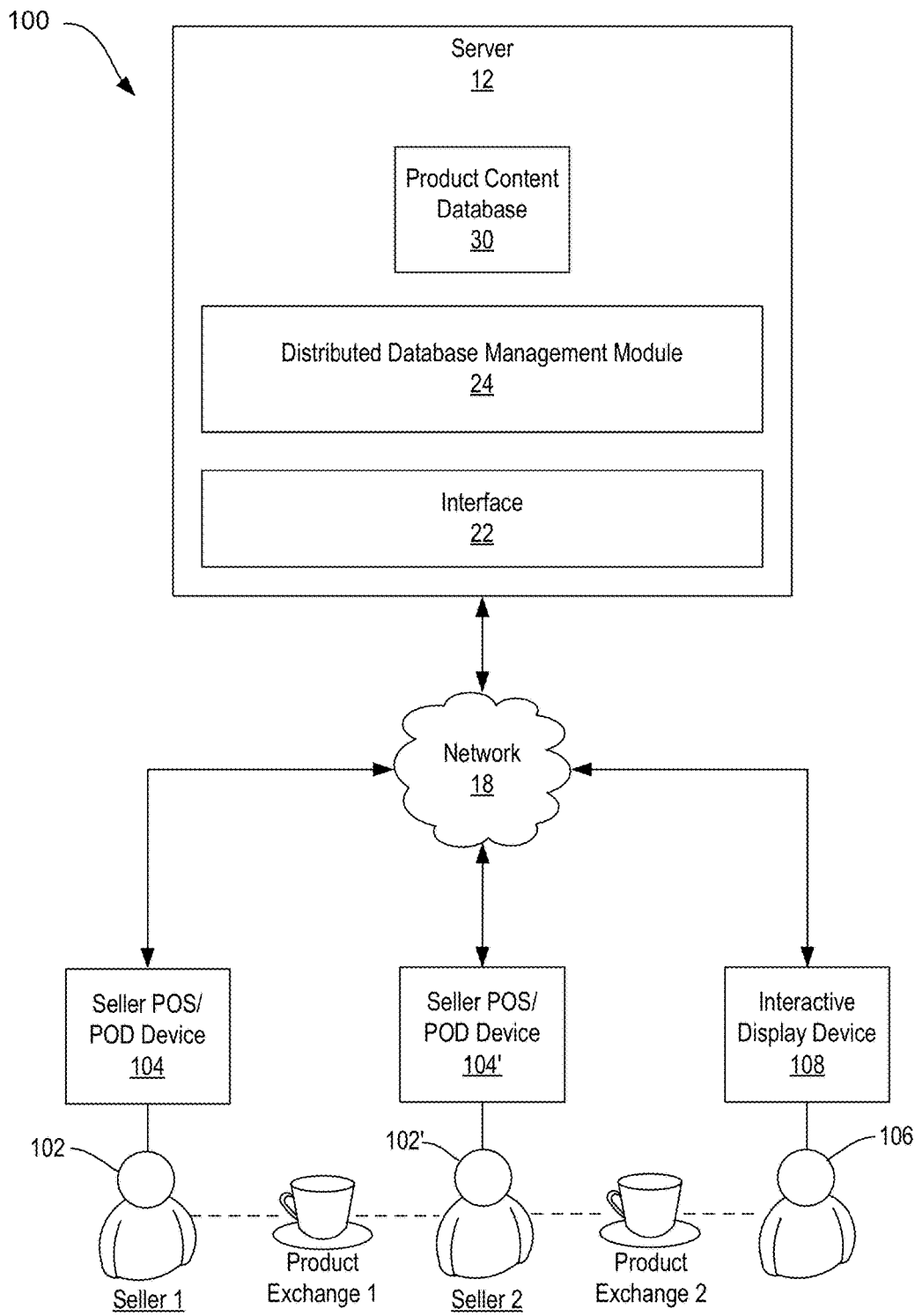
FIG. 11 is a block diagram illustrating another embodiment of the system of FIG. 4 for providing product information to a user based on the exchange of the product between at least two different sellers.

FIG. 11 is a block diagram illustrating another embodiment of the system of FIG. 4 for providing product information to a user based on the exchange of the product between at least two different sellers. In some instances, product information may be provided by more than one party as a product is transferred to a consumer. As shown, product information from two parties may be provided to a consumer, in a series of transactions via an intermediary retail channel. In this example, the first seller 102 of a product, such as coffee roaster, delivers units of a finished good (e.g., 12-oz. bags of roasted coffee), to a second seller 102' (e.g., a grocery store or other retail outlet), who will, in turn, sell the 12-oz. bags of roasted coffee to the consumer 106. Similar to the scenario of FIG. 7, at the point of delivery (POD) to the second seller 102', as the finished goods are packaged for delivery to the retail outlet, the first seller 102 may scan the units and associated a product variation with the particular units being delivered, this variation referencing certain product content. This variation may include the identity of the second seller 102' (such as the retail outlet). Subsequently, the second seller 102', through their own account in the server 12, may then access the product content database 30, access the variation assigned, and then produce and associate additional product content with that variation. In this way, the second seller 102' may append unique product content for delivery to the consumer 106. This action may be performed at the point of sale (POS), in a similar manner described in FIG. 9. The second seller's product content may include coupons, incentives, news, promotional, or informational content about the product or other related products, the location of the transaction, information about the second seller, and a combination thereof. The product content may be specific to the transaction, to the location of the transaction, to information about the individual consumer known to the second seller, and a combination thereof.

Figure 12:
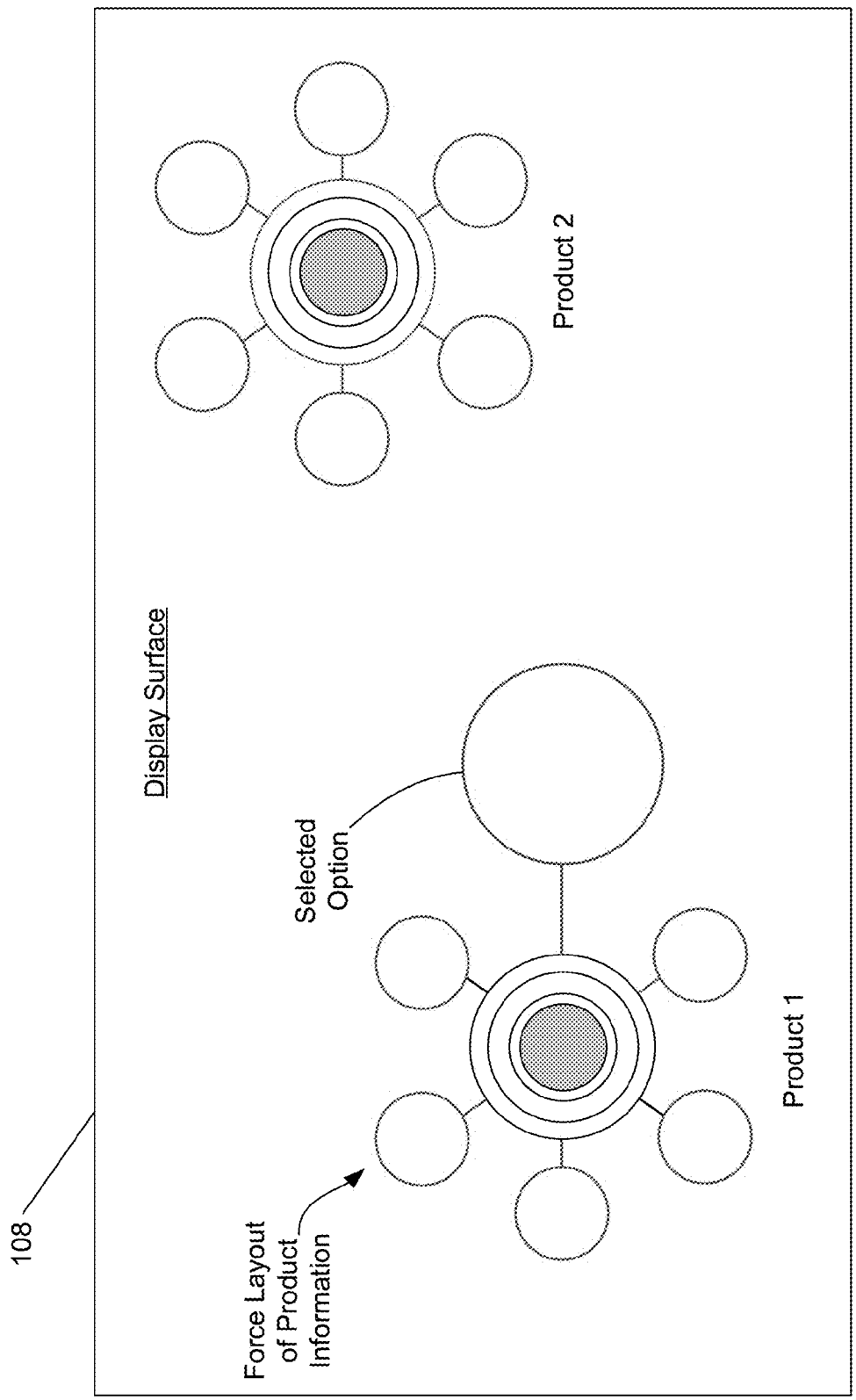
FIG. 12 is a top view of the display surface of the interactive display device illustrating exemplary visual representations of product information displayed to the user upon placement of a product on the display surface.

FIG. 12 is a top view of the display surface of the interactive display device 108 illustrating exemplary visual representations of product information displayed to the user upon placement of a product on the display surface. Accordingly, a consumer may passively request product information, simply by placing their cup of coffee upon the display surface, and, in turn, the device 108 is configured to automatically provide product information. The device 108 is configured to output product information to the consumer user in the form of a visual representation, such as an image or illustration, with which the consumer may interact so as to view details regarding product information. For example, the product information may displayed in a specific pattern relative to the physical product container, such as a force layout design resembling a spoke-hub pattern providing various options arranged and displayed along a perimeter of the product container. The options may behave as dynamic particles that repel one another but are bound to the center node by gravity. The options follow the cup and saucer as they slide around the table. Secondary options pop out to reveal deeper layers of content. Video, text, and image contents are displayed in pop-up windows when options are selected. The consumer may interact with the interface so as to select one or more options and further manipulate the product information (e.g., adjust size, view, orientation, placement of option, etc.). Furthermore, the device 108 is configured to accommodate multiple products placed on the display surface. For example, two or more products may be placed on the display surface and product information specific to such products may be provided to consumers, thereby allowing consumers to use the same device 108 (e.g., sharing same table) and further share information with others.

The information to be provided to a consumer may relate to various aspects of a food product, such as specific characteristics of the food product, origin of the food product, as well as who produced it, how it was produced, and information related to the seller of the food product. The different options may include, but are not limited to, product identity and preparation notes (e.g. type of coffee and origin), product characteristics and details (e.g., tasting notes, varietals, production methods, etc.), text, images or video files (e.g., images or video of a tour of the coffee estate, coffee production including specific supply chain processes, etc.), interactive maps or routes tracing origin and transactions (e.g., interactive origin map including pins and pathways tracing the route of the coffee from the cherry to the coffee shop), articles or publications related to product, and a dynamic stream of product content (e.g., social-media feed method including dynamic timeline or story related to product).

Figure 13:
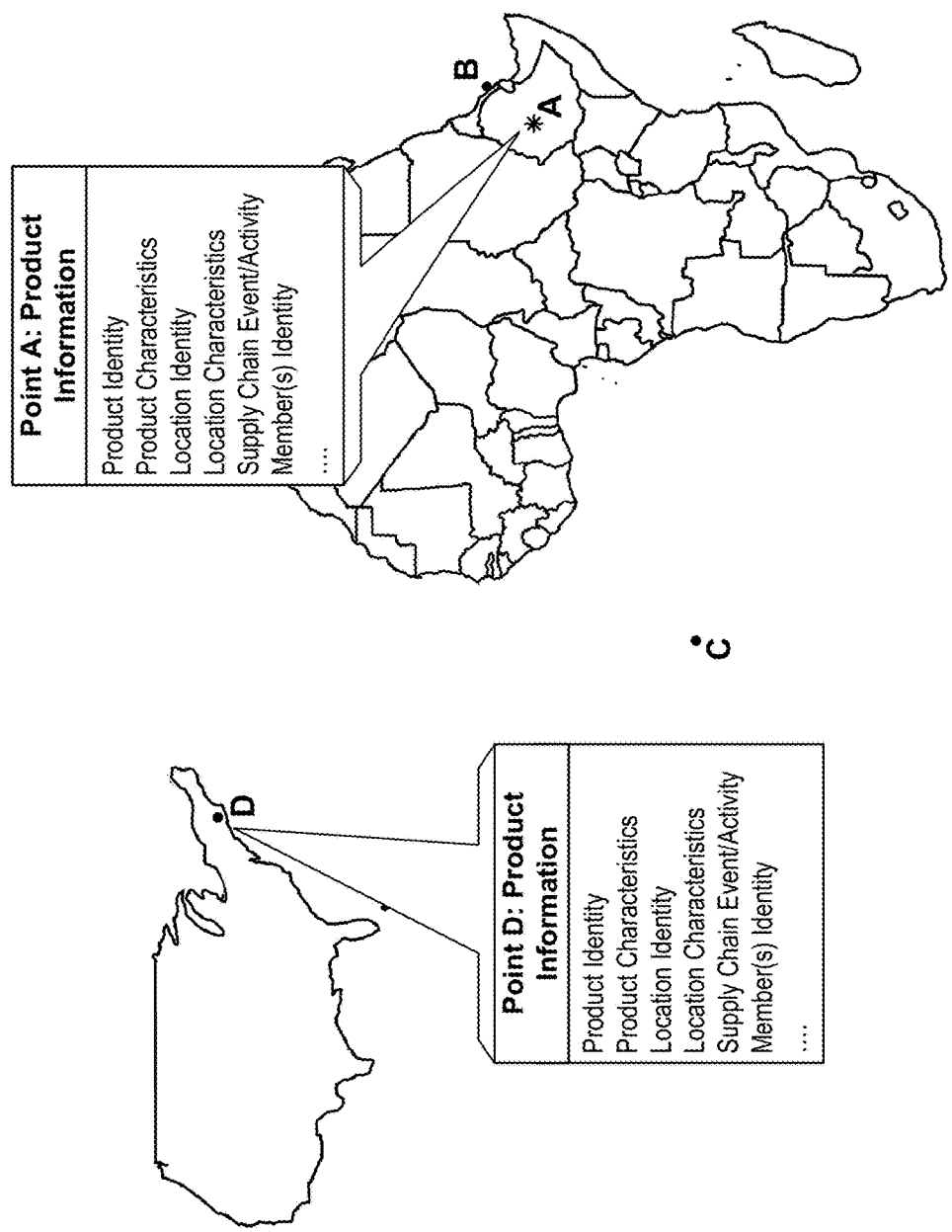
FIG. 13 shows an exemplary visual representation of product information displayed to a user via the interactive display device.

FIG. 13 shows an exemplary visual representation of product information displayed to a user via the interactive display device 108, wherein such information may include traceability information in the form of geographic locations. As shown in FIG. 13, a user may be presented with a map that includes various geographic locations (points A-D) associated with product movement and/or product handling/processing from a point of origin all the way through to the final exchange with a consumer. It should be noted that the map depicted in FIG. 13 is merely for purposes of illustration and the system of the present disclosure is configured to output other types of visual and interactive renderings for conveying product information. For example, the server 12 may be configured to generate and provide interactive timelines, reports, graphical representations, and the like.

The consumer may interact with the map so as to obtain specific details about a product. For example, the map depicts a visual representation of geographic locations (points A-D) associated with the movement of coffee from a point of origin at point A (e.g., farmer) all the way through to the final exchange of the coffee with a consumer at point D (e.g., sale of cup of coffee). In this instance, the user may be a consumer who has just purchased the cup of coffee and is interested in viewing information about that cup of coffee. However, it should be noted that the output of visual representation of product information, as described herein, may be provided to any one of the users associated with the supply chain, including, but not limited to, a manufacturer, producer, exporter, retailer, store owner, destination owner, etc. The user may interact with the map by simply selecting one of the points A-D so as to view product details associated with the geographic location selected.

The type of product information available at any given point (any of points A-D) may be based on the location associated with that point, the event or activity associated with that point, or other factors. As shown, a user may select point A, at which point the server 12 may further provide product information associated with that particular geographic location. Point A may generally correspond to the point of origin of the coffee (e.g., location in which the coffee was grown and harvested and possibly initially processed). Accordingly, the product information of point A may include, for example, the identity of the coffee product (e.g., name of coffee) and the characteristics of the coffee product (e.g., physical attributes of the coffee, including grading or classification, as well as the type of coffee product, which could be coffee cherry or parchment coffee, as point A is the point of origin). The product information may also include the identity of the location as well as characteristics of the location. In the instant example, the location may be a village or town in Ethiopia in which the coffee cherry was grown, harvested, and/or processed. The characteristics of the location may include the operator of the location, overall capacity of the location, current capacity of the location, seasonality of the location, operational status of the location, current weather at the location, and the like. The product information may further include details regarding an event or activity associated with point A. For example, the type of event may include the harvesting and subsequent sale of coffee cherry from the farmer to a producer or the processing of coffee cherry to produce parchment coffee. The details may include the date of harvest or processing, the total quantity harvested or processed, and the like. The product information may further include details about one or more members involved in the event, including details about the farmer and/or producer. The details may include a bio of the farmer or producer, harvest history of the farmer, processing history of the producer, and the like.

Upon selecting point D, the user may access product information associated with the sale of a cup of coffee to a consumer. Accordingly, some of the details of the coffee product have since been updated and additional details have been included at point D, as the product has moved through the supply chain and undergone multiple events/activities and exchanged hands multiple times. In this instance, the coffee product is no longer coffee cherry or coffee parchment, but rather a roasted coffee that has been brewed and served as an individual serving. Furthermore, the roasted coffee may include a blend of units of coffee product and may not be entirely composed of a single source of coffee bean, as previously described herein. For example, multiple units of parchment coffee may be blended during a milling process, thereby resulting in a blended green coffee (e.g., occurring at point B), and the blended green coffee may be further blended with other green coffee units during a roasting process. However, as previously described herein, the server 12 is configured to track individual units even when those individual units are split or combined with other individual units. Accordingly, the server 12 is able to provide a user with traceability information all the way back to the point of origin (point A).

Accordingly, the product information of point D may still include similar product information as was provided in point A (e.g., same identity of the coffee product, some of the similar characteristics of the coffee product, such as *Arabica* bean). However, the type of coffee product is now roasted coffee and the location of the coffee product has been updated to reflect the location of purchase (e.g., coffee shop in the United States). The characteristics of the location may include the operator of the location (e.g., name of the seller) and details about the seller. The product information may further include details regarding an event or activity associated with point D. For example, the type of event may include the sale of the cup of coffee from the seller to the consumer. The details may include the date of sale, the price paid for the cup of coffee, quantity of the cup of coffee, the type of the cup of coffee, designer of the cup, and the like. The product information may further include details about one or more members involved in the event, including details about the seller and consumer. The details may include a bio of the seller, history of the seller producer, and the like.

It should be noted that at any point, a user may be able to navigate through the interface so as to pull up all types of product information associated with all events/activities occurring through the supply chain. For example, a user (in the event they have access) may be able to review the product information associated with point C (transportation of the product), which may include product transit logs, and the like. Similarly, a user may review product information associated with point B (production of the coffee product, such as milling of parchment coffee to create green coffee). Accordingly, in addition to providing real-time visibility of a product, the server 12 is configured to provide all types of traceability information associated with a product all the way through the supply chain from the final destination back through to the point of origin.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for providing product information to a user at a point of sale (POS) or point of delivery (POD), the system comprising:
a POS/POD computing device associated with a seller comprising a processor coupled to a memory containing instructions executable by the processor to cause the POS/POD computing device to:
correlate a unique identifier that is associated with a product to an identification of the product;
generate a request having embedded data comprising: a product instance identifier that is tied to the unique identifier and further associated with an instance of a product being sold or delivered to a buyer; and a selected one of a plurality of different and separate information content references, wherein each of the information content references includes informational data associated with the product, wherein the request is generated based on seller input via the POS/POD computing device, the seller input comprising selection of the product instance identifier and selection of the one of the plurality of different information content references; and
transmit the request to a server, the server comprising a database concurrently storing the plurality of different and separate information content references, wherein the request is transmitted during the instance of the product being sold or delivered to the buyer, wherein the product instance identifier is dynamically associated with the selected one of the plurality of different information content references during the instance of the product being sold or delivered to the buyer at the point of sale or delivery; and
an interactive display device comprising a processor coupled to a memory containing instructions executable by the processor to cause the interactive display device to:
recognize that the product has been placed on, or in proximity to, a display surface of the interactive display device;
recognize the unique identifier that is associated with the product;
generate, post-sale or delivery of the product to the buyer, a request for information regarding the product based on the recognition of the product instance unique identifier that is associated with the product, wherein the request comprises at least the product instance identifier tied to the unique identifier;
transmit the request to the server;
receive, over a communication channel, the selected information content reference that has been dynamically associated with the product instance identifier from the server in response to the request; and
display the informational data associated with the product sold or delivered to the buyer via the display surface.

2. The system according to claim 1, further comprising the server.

3. The system according to claim 1, wherein at least one of the plurality of different and separate information content references comprises a data file comprising informational data associated with at least the product.

4. The system according to claim 1, wherein at least one of the plurality of different and separate information content references comprises a data file directed to at least one other data file associated with one of the information content references.

5. The system according to claim 1, wherein the informational data is selected from the group consisting of: product information and details; characteristics of one or more users associated with the product; details surrounding the exchange of the product from one user to another user, and combinations thereof.

6. The system according to claim 1, wherein the product is a food or beverage product held by a container and the unique identifier is associated with the container.

7. The system according to claim 6, wherein the unique identifier is a machine-readable identifier label that is selected from the group consisting of: text, graphics, an image, a linear barcode, a matrix barcode, an RFID element, and a combination thereof.

8. The system according to claim 6, wherein the interactive display device comprises a touchscreen display and the unique identifier comprises a passive untouched capacitive assembly.

9. The system according to claim 8, wherein the passive untouched capacitive assembly is a circular ring that comprises two or more electrically conductive nibs that protrude from the ring, the nibs being configured on the passive untouched capacitive assembly such that a touch sensor of the interactive display device recognizes that the product has been placed on the display surface due to the nibs.

10. The system according to claim 9, wherein the touch sensor is configured to detect multi-point input on the display surface via capacitance measurement.

11. The system according to claim 9, wherein the passive untouched capacitive assembly is a circular ring that comprises three or more electrically conductive nibs.

12. The system according to claim 11, wherein the three or more electrically conductive nibs are uniquely arranged about each passive untouched capacitive assembly.

13. A system for providing product information to a user at a point of sale (POS) or point of delivery (POD), the system comprising:
a server comprising a database that concurrently stores a plurality of different and separate information content references, wherein each of the information content references includes informational data associated with a product, the server comprising a processor coupled to a memory containing instructions executable by the processor to cause the server to:
receive and store, from a POS/POD computing device associated with a seller, a request having embedded data comprising: a product instance identifier that is tied to a unique identifier associated with a product and correlated to an identification of the product and further associated with an instance of the product being sold or delivered to a buyer; and a selected one of a plurality of different and separate information content references, wherein the request is generated based on seller input via the POS/POD computing device, the seller input comprising selection of the product instance identifier and selection of the one of the plurality of different information content references;
dynamically associate, during the instance of the product being sold or delivered to the buyer at the point of sale or delivery, the product instance identifier with the selected one of the plurality of different information content references based on a reading of the embedded data by the processor;

receive, post-sale or delivery of the product to the buyer, a request for information from an interactive display device regarding the product based, at least in part, on recognition of the unique identifier that is associated with the product in response to placement of the product on a display surface of the interactive display device, wherein the request comprises at least the product instance identifier tied to the unique identifier; and output to the buyer, over a communication channel, the selected information content reference that has been dynamically associated with the product instance identifier to thereby display the informational data associated with the product sold or delivered to the buyer.

14. The system according to claim 13, wherein the informational data is selected from the group consisting of: product information and details; characteristics of one or more users associated with the product; details surrounding the exchange of the product from one user to another user, and combinations thereof.

15. The system according to claim 13, wherein at least one of the plurality of different and separate information content references comprises a data file comprising informational data associated with at least the product.

16. The system according to claim 13, wherein at least one of the plurality of different and separate information content references comprises a data file directed to at least one other data file associated with one of the product content references.

17. The system according to claim 13, wherein the interactive display device comprises a touchscreen display and the unique identifier comprises a passive untouched capacitive assembly.

18. The system according to claim 17, wherein the passive untouched capacitive assembly is a circular ring that comprises two or more electrically conductive nibs that protrude from the ring, the nibs being configured on the passive untouched capacitive assembly such that a touch sensor of the interactive display device recognizes that the product has been placed on the display surface due to the nibs.

19. The system according to claim 18, wherein the touch sensor is configured to detect multi-point input on the display surface via capacitance measurement.

20. The system according to claim 18, wherein the passive untouched capacitive assembly is a circular ring that comprises three or more electrically conductive nibs, wherein the three or more electrically conductive nibs are uniquely arranged about each passive untouched capacitive assembly.

* * * * *